US009754230B2

(12) United States Patent
Pulido De Los Reyes et al.

(10) Patent No.: US 9,754,230 B2
(45) Date of Patent: *Sep. 5, 2017

(54) DEPLOYMENT OF A BUSINESS INTELLIGENCE (BI) META MODEL AND A BI REPORT SPECIFICATION FOR USE IN PRESENTING DATA MINING AND PREDICTIVE INSIGHTS USING BI TOOLS

(75) Inventors: Ruben Pulido De Los Reyes, Stuttgart (DE); Christoph Sieb, Schoenaich (DE)

(73) Assignee: International Business Machines Corporation, Armonk, NY (US)

( * ) Notice: Subject to any disclaimer, the term of this patent is extended or adjusted under 35 U.S.C. 154(b) by 375 days.

This patent is subject to a terminal disclaimer.

(21) Appl. No.: 12/955,745

(22) Filed: Nov. 29, 2010

(65) Prior Publication Data

US 2012/0136684 A1 May 31, 2012

(51) Int. Cl.
*G06Q 10/10* (2012.01)
*G06Q 10/06* (2012.01)

(52) U.S. Cl.
CPC ......... *G06Q 10/063* (2013.01); *G06Q 10/067* (2013.01)

(58) Field of Classification Search
CPC ........ G06Q 10/10; G06Q 10/00; G06Q 40/00; G06Q 10/063; G06Q 10/067; G06F 17/30554; G06F 17/60
USPC ....................................................... 705/7.11
See application file for complete search history.

(56) References Cited

U.S. PATENT DOCUMENTS

| | | | |
|---|---|---|---|
| 5,627,979 A * | 5/1997 | Chang et al. ................. | 715/763 |
| 5,852,819 A * | 12/1998 | Beller | |
| 6,279,008 B1 * | 8/2001 | Tung Ng et al. | |
| 6,631,519 B1 * | 10/2003 | Nicholson et al. ........... | 717/169 |
| 6,714,979 B1 * | 3/2004 | Brandt et al. ................. | 709/225 |
| 6,901,405 B1 * | 5/2005 | McCrady et al. | |
| 6,993,533 B1 * | 1/2006 | Barnes | |

(Continued)

FOREIGN PATENT DOCUMENTS

| | | |
|---|---|---|
| CN | 101271475 | 9/2008 |
| CN | 101477522 | 7/2009 |

(Continued)

OTHER PUBLICATIONS

Insightful Miner 3 User's Guide Insightful Corporation, Jun. 2003.*

(Continued)

*Primary Examiner* — Romain Jeanty
(74) *Attorney, Agent, or Firm* — Janaki K. Davda; Konrad, Raynes, Davda and Victor LLP

(57) ABSTRACT

A Business Intelligence (BI) meta model template is selected based on one or more meta model object types in a model structure. A BI meta model is generated from the selected BI meta model template. One or more BI report specification templates are selected based on a mining model type. A BI report specification is generated from the selected one or more BI report specification templates, a schema of the model structure, and content of the model structure. The BI meta model and the BI report specification are deployed to a BI server for use in generating a BI report using a BI tool at the BI server. In response to a user request for a BI report, the BI report is generated with a BI tool at the BI server that uses the BI meta model and the BI report specification.

14 Claims, 59 Drawing Sheets

(56) References Cited

U.S. PATENT DOCUMENTS

| | | | |
|---|---|---|---|
| 7,015,911 B2* | 3/2006 | Shaughnessy et al. | 345/440 |
| 7,072,822 B2* | 7/2006 | Humenansky et al. | 703/22 |
| 7,194,457 B1* | 3/2007 | Alavi et al. | |
| 7,222,130 B1* | 5/2007 | Cras et al. | 707/803 |
| 7,275,053 B1* | 9/2007 | Gardner et al. | |
| 7,275,211 B2* | 9/2007 | Ferguson et al. | 715/234 |
| 7,293,008 B2* | 11/2007 | Potter et al. | |
| 7,293,031 B1* | 11/2007 | Dusker et al. | |
| 7,349,862 B2* | 3/2008 | Palmer et al. | 705/7.29 |
| 7,506,046 B2* | 3/2009 | Rhodes | 709/224 |
| 7,512,623 B2* | 3/2009 | Apps et al. | |
| 7,512,627 B2* | 3/2009 | Hossfeld et al. | |
| 7,610,300 B2* | 10/2009 | Legault et al. | |
| 7,747,564 B2* | 6/2010 | Westman et al. | 707/603 |
| 7,844,892 B2* | 11/2010 | Shewchenko et al. | 715/215 |
| 7,870,016 B2* | 1/2011 | Fazal et al. | 705/7.36 |
| 7,885,918 B2* | 2/2011 | Statchuk | 707/603 |
| 7,885,978 B2* | 2/2011 | Dumitrascu et al. | 707/802 |
| 7,917,382 B2* | 3/2011 | Cereghini et al. | 705/7.31 |
| 7,945,589 B1* | 5/2011 | Weiss et al. | 707/795 |
| 7,970,783 B2* | 6/2011 | Potter et al. | 707/760 |
| 7,984,115 B2* | 7/2011 | Tien et al. | 709/219 |
| 8,073,863 B2* | 12/2011 | Rachmiel et al. | 707/769 |
| 8,086,462 B1* | 12/2011 | Alonso et al. | 704/275 |
| 8,103,695 B2* | 1/2012 | Warner et al. | 707/791 |
| 8,214,329 B2* | 7/2012 | Gilder et al. | 707/622 |
| 8,234,569 B2* | 7/2012 | Penner | 715/255 |
| 8,468,177 B2* | 6/2013 | Reeves et al. | 707/802 |
| 2002/0059280 A1 | 5/2002 | Slesinsky | |
| 2003/0204487 A1* | 10/2003 | Sssv et al. | 707/1 |
| 2004/0230471 A1* | 11/2004 | Putnam Brookes | 705/10 |
| 2007/0011224 A1* | 1/2007 | Mena | 709/200 |
| 2007/0174290 A1* | 7/2007 | Narang et al. | 707/10 |
| 2008/0046805 A1* | 2/2008 | Shewchenko et al. | 715/215 |
| 2008/0126326 A1* | 5/2008 | Potter et al. | 707/4 |
| 2008/0195651 A1* | 8/2008 | Rachmiel et al. | 707/102 |
| 2008/0250057 A1* | 10/2008 | Rothstein et al. | 707/102 |
| 2008/0288448 A1* | 11/2008 | Agredano et al. | 707/2 |
| 2009/0012983 A1* | 1/2009 | Senneville et al. | 707/101 |
| 2009/0172024 A1 | 7/2009 | Hsu et al. | |
| 2009/0172697 A1* | 7/2009 | Daviss et al. | 719/316 |
| 2010/0287014 A1 | 11/2010 | Gaulin et al. | |
| 2011/0295795 A1* | 12/2011 | Venkatasubramanian et al. | 707/602 |

FOREIGN PATENT DOCUMENTS

| | | |
|---|---|---|
| EP | 1475733 | 11/2004 |
| EP | 1843259 | 10/2007 |
| EP | 2249299 | 11/2010 |

OTHER PUBLICATIONS

Cognos 8—Cognos Connection User Guide Cognos, 2006.*
Cognos 8—Framework Manager User Guide Cognos, 2007.*
Gonos 8 Business Intelligence—Getting Started Cognos, 2006.*
Cognos 8 Cognos Controller—Architecture and Deployment Guide Cognos, 2007.*
Cognos 8 Business Intelligence—Report Studio User Guide Cognos, 2006.*
Cognos ReportNet Cognos, Jul. 2003.*
Cabena, Peter et al., Intelligent Miner for Data Applications Guide IBM, Mar. 1999.*
Cognos 8 Business Intelligence—Report Studio—User Guide Cognos, 2006.*
Kramer, Roland, SAP Business Intelligence: SAP Netweaver BW and BI Solution Platform Overview including Sybase Solutions, SAP, Sep. 2011.*
Muhanna, Waleed A., Meta-Modeling Concepts and Tools for Model Management: A Systems Approach Management Science, vol. 40, No. 9, Sep. 1994.*
Oracle Business Intelligence Publisher—Report Designers Guide Release 10.1.3.4 Oracle, Aug. 2008.*
SPSS Modeler Wikipedia.org, Retrieved Jan. 24, 2013.*
Data Mining with MicroStrategy—Using the MicroStrategy BI Platform to Distribute Data Mining and Perdictive Analytics to the Masses, Whitepaper, MicroStrategy, 2005.*
Leonhardi, Benjamin G. et al., Integration of InfoSphere Warehouse Data Mining with IBM Cognos Reporting, Part 3 IBM Developer Works, Dec. 30, 2008.*
Vyss, Rayudu et al., Generate Cognos reports using InfoSphere Warehouse Cubes IBM DeveloperWorks, 2009.*
International Search Report and Written Opinion for International Application No. PCT/EP2011/069338, Mailed Feb. 2, 2012, 11 pp.
Preliminary Amendment for U.S. Appl. No. 13/491,303, dated Jun. 7, 2012, 6 pp. [54.50C1 (PrelimAmend)].
U.S. Appl. No. 13/491,303, filed Jun. 7, 2012, entitled "Fast, Dynamic, Data-Driven Report Deployment of Data Mining and Predictive Insight Into Business Intelligence (BI) Tools", invented by R. Pulido De Los Reyes et al., 86 pp. [54.50C1 (Appln)].
The Apache Software Foundation, "Apache Velocity—Velocity User Guide", [online], [Retrieved on Jan. 16, 2013]. Retrieved from the Internet at <URL: http://velocity.apache.org/engine/releases/velocity-1.5/user-guide.html#velocity_template_language_vtl:_an_introduction>, © 2000-2007 The Apache Software Foundation Last Published: Mar. 6, 2007, Total 37 pp.
Data Mining Group, "PMML Version 4.1" [online], [Retrieved on Jan. 3, 2013]. Retrieved from the Internet at <URL: http://www.dmg.org/pmml-v4-1.html>, Total 1 p.
Data Mining Group, "PMML 4.1—General Structure of a PMML Document", [online], [Retrieved on Jan. 3, 2013]. Retrieved from the Internet at <URL: http://www.dmg.org/v4-1/GeneralStructure.html>, Total 8 pp.
Yin, J., "IBM SPSS Modeler—Package Import and Export", [online], [Retrieved on Jan. 3, 2013]. Retrieved from the Internet at <URL: http://www.ironsidegroup.com/2012/01/10/ibm-spss-modeler-%E2%80%93-package-import-and-export-5/>, Jan. 10, 2012, Total 11 pp.
Amendment 1, Jan. 17, 2013, for U.S. Appl. No. 13/491,303, filed Jun. 7, 2012 by R. Pulido De Los Reyes et al., Total 14 pp. [54.50C1 (Amend1)].
Office Action 1, Sep. 6, 2012, for U.S. Appl. No. 13/491,303, filed Jun. 7, 2012 by R. Pulido De Los Reyes et al., Total 22 pp. [54.50C1 (OA1)].
Singh, Navneet, "Enterprise Reporting with Oracle Reports: Reliable, Extensible, and Integrated", An Oracle White Paper, Aug. 2005, Oracle Corporation, Total 16 pp.
Office Action, dated Jul. 11, 2014, for U.S. Appl. No. 13/491,303 (54.50C1), filed Jun. 7, 2012, invented by Ruben Pulido De Los Reyes et al., Total 23 pages.
Response to Office Action, dated Nov. 10, 2014, for U.S. Appl. No. 13/491,303 (54.50C1), filed Jun. 7, 2012, invented by Ruben Pulido De Los Reyes et al., Total 13 pages.
Final Office Action, dated Feb. 1, 2013, for U.S. Appl. No. 13/491,303, filed Jun. 7, 2012, entitled, "Deployment of a Business Intelligence (BI) Meta Model and a BI Report Specification for Use in Presenting Data Mining and Predictive Insights Using BI Tools", invented by Ruben Pulido De Los Reyes et al., pp. 1-34.
Response to final Office Action, dated May 1, 2013, for U.S. Appl. No. 13/491,303, filed Jun. 7, 2012, entitled, "Deployment of a Business Intelligence (BI) Meta Model and a BI Report Specification for Use in Presenting Data Mining and Predictive Insights Using BI Tools", invented by Ruben Pulido De Los Reyes et al., pp. 1-11.
Final Office Action, dated Nov. 18, 2014, for U.S. Appl. No. 13/491,303 (54.50C1) filed Jun. 7, 2012, invented by R. Pulido De Los Reyes et al., Total 27 pages.
Response to Final Office Action, dated Mar. 4, 2015, for U.S. Appl. No. 13/491,303 (54.50C1) filed Jun. 7, 2012, invented by R.Pulido De Los Reyes et al., Total 10 pages.
Information Materials for IDS, dated May 20, 2015, Total 4 pages.
Office Action, dated Apr. 17, 2015, for U.S. Appl. No. 13/491,303 (54.50C1), filed Jun. 7, 2012, invented by Ruben Pulido De Los Reyes et al., Total 19 pages.

(56) References Cited

OTHER PUBLICATIONS

Response to Office Action, dated Jul. 16, 2015, for U.S. Appl. No. 13/491,303 (54.50C1), filed Jun. 7, 2012, invented by Ruben Pulido De Los Reyes et al., Total 12 pages.
Publication 2009/0172024 is an English counterpart to CN101477522.
Cognos 8 Business Intelligence User Guide, dated Dec. 31, 2006, Total 70 pages.
Final Office Action, dated Jul. 24, 2015, for U.S. Appl. No. 13/491,303 (54.50C1), filed Jun. 7, 2012, invented by Ruben Pulido De Los Reyes et al., Total 24 pages.
Response to Final Office Action, dated Oct. 26, 2015, for U.S. Appl. No. 13/491,303 (54.50C1), filed Jun. 7, 2012, invented by Ruben Pulido De Los Reyes et al., Total 12 pages.
Office Action, dated Mar. 1, 2016, for U.S. Appl. No. 13/491,303 (54.50C1), filed Jun. 7, 2012, invented by Ruben Pulido De Los Reyes et al., Total 18 pages.
Response to Office Action, dated Jun. 1, 2016 for U.S. Appl. No. 13/491,303 (54.50C1), filed Jun. 7, 2012, invented by Ruben Pulido De Los Reyes et al., Total 12 pages.
Office Action, dated Nov. 10, 2016, for U.S. Appl. No. 13/491,303 (54.50C1), filed Jun. 7, 2012, invented by Ruben Pulido De Los Reyes et al., Total 12 pages.
Response to Office Action, dated Feb. 10, 2017, for U.S. Appl. No. 13/491,303 (54.50C1), filed Jun. 7, 2012, invented by Ruben Pulido De Los Reyes et al., Total 5 pages.
Final Office Action, dated Jun. 9, 2016, for U.S. Appl. No. 13/491,303 (54.50C1), filed Jun. 7, 2012, invented by Ruben Pulido De Los Reyes et al., Total 23 pages.
Response to Final Office Action, dated Sep. 9, 2016, for U.S. Appl. No. 13/491,303 (54.50C1), filed Jun. 7, 2012, invented by Ruben Pulido De Los Reyes et al., Total 14 pages.
Notice of Allowance, dated Apr. 27, 2017, for U.S. Appl. No. 13/491,303 (54.50C1), filed Jun. 7, 2012, invented by Ruben Pulido De Los Reyes et al., Total 18 pages.
Notice to File Corrected Application Papers, dated May 23, 2017, for U.S. Appl. No. 13/491,303 (54.50C1), filed Jun. 7, 2012, invented by Ruben Pulido De Los Reyes et al., Total 3 pages.
Response to Notice to File Corrected Application Papers, dated May 25, 2017, for U.S. Appl. No. 13/491,303 (54.50C1), filed. Jun. 7, 2012, invented by Ruben Pulido De Los Reyes et al., Total 3 pages.

\* cited by examiner

| | CLIENT_ID | AGE | GENDER | MARITAL_STATUS | PROFESSION | NBR_YEARS_CLI |
|---|---|---|---|---|---|---|
| 1 | 00501583 | 3... | M | married | craftsmen,... | 8.0 |
| 2 | 01263033 | 4... | M | single | craftsmen,... | 9.0 |
| 3 | 00283696 | 5... | F | married | employee ... | 18.0 |
| 4 | 00046069 | 3... | M | single | craftsmen,... | 11.0 |
| 5 | 00141327 | 3... | M | married | employee ... | 7.0 |
| 6 | 00096669 | 5... | M | married | worker ... | 15.0 |
| 7 | 00216430 | 7... | M | married | pensioner ... | 10.0 |
| 8 | 00414751 | 2... | M | single | worker ... | 11.0 |

200

| SAVINGS_ACCOUNT | ONLINE_ACCESS | JOINED_ACCOUNTS | BANKCARD | AVERAGE_BALANCE |
|---|---|---|---|---|
| NO | NO | NO | NO | -38735.00 |
| NO | NO | NO | NO | -6282.00 |
| NO | NO | YES | NO | -3475.00 |
| NO | NO | NO | NO | -152.00 |
| NO | NO | YES | NO | -103.00 |
| NO | NO | YES | NO | -72.00 |
| NO | NO | NO | NO | -66.00 |
| NO | NO | NO | NO | -42.00 |

FIG. 2

```
<?xml version="1.0" encoding="UTF-8" ?>
<PMML version="3.0" xmlns="http://www.dmg.org/PMML-3_0"
xmlns:xsi="http://www.w3.org/2001/XMLSchema-instance"
xsi:schemaLocation="http://www.dmg.org/PMML-3_0 http://
www.dmg.org/v3-0/pmml-3-0.xsd">
 <Header copyright="Copyright IBM Corp. 2002, 2009 All Rights
Reserved">
  <Application name="IBM DB2 Intelligent Miner" version="9.7"/>
  <Timestamp>2010-06-24 16:10:24</Timestamp>
 </Header>
 <MiningBuildTask>
  <Extension><?xml version="1.0" encoding="UTF-8" ?>
<DataMining><MiningTask
trainData="trainData"><MiningData name="trainData"
tableName="IWSCHEMA4B8C3B.INPUT_02_0"><Column
alias="CLIENT_ID" name="CLIENT_ID" sqlType="CHAR"/><Column
alias="AGE" name="AGE" sqlType="REAL"/><Column alias="GENDER"
name="GENDER" sqlType="CHAR"/><Column alias="MARITAL_STATUS"
name="MARITAL_STATUS" sqlType="CHAR"/><Column
alias="PROFESSION" name="PROFESSION" sqlType="CHAR"/><Column
alias="NBR_YEARS_CLI" name="NBR_YEARS_CLI" sqlType="REAL"/
><Column alias="SAVINGS_ACCOUNT" name="SAVINGS_ACCOUNT"
sqlType="CHAR"/><Column alias="ONLINE_ACCESS"
name="ONLINE_ACCESS" sqlType="CHAR"/><Column
alias="JOINED_ACCOUNTS" name="JOINED_ACCOUNTS" sqlType="CHAR"/
><Column alias="BANKCARD" name="BANKCARD" sqlType="CHAR"/
><Column alias="AVERAGE_BALANCE" name="AVERAGE_BALANCE"
sqlType="DECIMAL"/></MiningData><MiningSettings
algorithm="Demographic"><LogicalDataSpec><MiningField
name="CLIENT_ID" type="categorical"/><MiningField name="AGE"
type="numerical"/><MiningField name="GENDER"
type="categorical"/><MiningField name="MARITAL_STATUS"
type="categorical"/><MiningField name="PROFESSION"
type="categorical"/><MiningField name="NBR_YEARS_CLI"
type="numerical"/><MiningField name="SAVINGS_ACCOUNT"
type="categorical"/><MiningField name="ONLINE_ACCESS"
type="categorical"/><MiningField name="JOINED_ACCOUNTS"
type="categorical"/><MiningField name="BANKCARD"
type="categorical"/><MiningField name="AVERAGE_BALANCE"
type="numerical"/></LogicalDataSpec><ClusSettings
maxNumberOfClusters="3"/></MiningSettings><TaskControl
errorTable="IDMMX.ERRORTABLE"
progressTable="IDMMX.PROGRESSTABLE"/></MiningTask></
DataMining></Extension>
 </MiningBuildTask>
```

FIG. 3A

```
<DataDictionary numberOfFields="11">
...
</DataDictionary>
<ClusteringModel modelName="BANK.CUSTOMERS"
modelClass="distributionBased" functionName="clustering"
algorithmName="Demographic" numberOfClusters="3" x-
maxNumClusters="3" x-execTime="0.625" x-
similarityThreshold="0.5" x-quality="0.563763177784395">
...
  <Cluster name="1" x-quality="0.566357470559721">
   <Extension name="X-FieldQuality">
    <X-FieldQuality>
     <Array n="10" type="real"> 0.369694231426071
0.315850487438486 0.500586931050124 0.905631940739173
0.158530957807805 0.66223650577451 0.706439493311965
0.883141287256352 0.51522758998656 0.646235280806166</Array>
    </X-FieldQuality>
   </Extension>
   <Extension name="Cluster">
    <Cluster x-quality="0.569929725075265">
     <Extension name="X-FieldQuality">
      <X-FieldQuality>
       <Array n="10" type="real"> 0.372366082901858
0.316624680376959 0.500171054339825 0.923555847867698
0.159131383475536 0.664383220571661 0.702060849105336
0.895896134770125 0.512044618344301 0.653063378999348</Array>
      </X-FieldQuality>
     </Extension>
     <Array n="29" type="real"> 18136.4471250503
52.6043425814234 17.7696019300362 0.509248090068355
0.490751909931645 0.960796139927624 0.0112585444310414 0
0.0154804985926819 0.00502613590671492 0.00562927221552071
0.00180940892641737 0.0434258142340169 0.194008845999196
0.149376759147567 0.197225572979493 0.0605146763168476
0.205870526739043 0.0502613590671492 0.0991154000804182
0.000201045436268597 0.786690792119019 0.213309207880981
0.817852834740651 0.182147165259349 0.0550864495375955
0.944913550462405 0.577603538399678 0.422396461600322</Array>
```

FIG. 3B

```
    <Partition name="1" size="4974">
     <PartitionFieldStats field="AGE"> ... </
PartitionFieldStats>
     ...
     <PartitionFieldStats field="MARITAL_STATUS">
      <Counts totalFreq="4974" invalidFreq="0" missingFreq="0"/>
      <Array n="7" type="int"> 4779 56 0 77 25 28 9</Array>
     </PartitionFieldStats>
     ...
    </Partition>
   </Cluster>
  </Extension>
  ...
   <Partition name="1" size="4991">
    <PartitionFieldStats field="AGE"> ... </PartitionFieldStats>
    ...
    <PartitionFieldStats field="MARITAL_STATUS">
     <Counts totalFreq="4991" invalidFreq="0" missingFreq="0"/>
     <Array n="7" type="int"> 4748 85 0 78 34 36 10</Array>
    </PartitionFieldStats>
    ...
   </Partition>
  </Cluster>
  <Cluster name="2" x-quality="0.437614645474381">
   ...
  </Cluster>
  <Cluster name="3" x-quality="0.567898138889359">
   ...
  </Cluster>
 </ClusteringModel>
</PMML>
```

FIG. 3C

| ID | FIELDNAME | CATVALUE | NUMVALUE | NUMVALUE2 | FREQUENCY | EXPECTEDFREQ |
|---|---|---|---|---|---|---|
| 1 | MARITAL_STATUS | married | null | null | 4779 | 2727 |
| 1 | MARITAL_STATUS | single | null | null | 56 | 1213 |
| 1 | MARITAL_STATUS | child | null | null | 0 | 349 |
| 1 | MARITAL_STATUS | cohabitant | null | null | 77 | 109 |
| 1 | MARITAL_STATUS | divorced | null | null | 25 | 155 |
| 1 | MARITAL_STATUS | widowed | null | null | 28 | 370 |
| 1 | MARITAL_STATUS | separated | null | null | 9 | 50 |
| 1 | NBR_YEARS_CLI | null | 8.0 | null | 131 | 166 |
| 1 | NBR_YEARS_CLI | null | 9.0 | null | 115 | 147 |

```xml
<?xml version="1.0" encoding="UTF-8" ?>
<project xmlns="http://www.developer.cognos.com/schemas/bmt/60/1"
    xmlns:xsi="http://www.w3.org/2001/XMLSchema-instance"
    xsi:schemaLocation="http://www.developer.cognos.com/schemas/bmt/60/1
BMTModelSpecification.xsd">
    <name>BANK_CUSTOMERS_PACKAGE</name>
    <locales>
     <locale>en</locale>
    </locales>
    <defaultLocale>en</defaultLocale>
    <namespace>
        <name locale="en">BANK_CUSTOMERS_NS</name>
        <lastChanged>2010-02-22T15:16:13</lastChanged>
        <lastChangedBy>Anonymous</lastChangedBy>
        <querySubject status="valid">
            <name locale="en">BANK_CUSTOMERS_DISTR</name>
            <lastChanged>2010-02-22T15:16:13</lastChanged>
            <lastChangedBy>Anonymous</lastChangedBy>
            <definition>
                <dbQuery>
                    <sources>
                        <dataSourceRef>[].[dataSources].[DWESAMP]</dataSourceRef>
                    </sources>
                    <sql type="cognos">
                        Select
                        <column>*</column>
                        from
                        <table>[DWESAMP].BANK_CUSTOMERS_DISTR</table>
                    </sql>
                    <tableType>table</tableType>
                </dbQuery>
            </definition>
            <determinants />
            <queryItem>
                <name locale="en">ID</name>
                <lastChanged>2010-02-22T15:16:13</lastChanged>
                <lastChangedBy>Anonymous</lastChangedBy>
                <externalName>ID</externalName>
                <usage>attribute</usage>
```

```
                <datatype>int32</datatype>
                <precision>0</precision>
                <scale>0</scale>
                <size>4</size>
                <nullable>true</nullable>
                <regularAggregate>count</regularAggregate>
                <semiAggregate>unsupported</semiAggregate>
                <collationSequenceLevel>0</collationSequenceLevel>
</queryItem>
<queryItem>
        <name locale="en">FIELDNAME</name>
        <lastChanged>2010-02-22T15:16:13</lastChanged>
        <externalName>FIELDNAME</externalName>
        <usage>attribute</usage>
        <datatype>characterLength16</datatype>
        <precision>128</precision>
        <size>258</size>
        <nullable>true</nullable>
        <regularAggregate>unsupported</regularAggregate>
        <semiAggregate>unsupported</semiAggregate>
        <collationSequenceLevel>0</collationSequenceLevel>
</queryItem>
<queryItem>
        <name locale="en">CATVALUE</name>
        <lastChanged>2010-02-22T15:16:13</lastChanged>
        <externalName>CATVALUE</externalName>
        <usage>attribute</usage>
        <datatype>characterLength16</datatype>
        <precision>128</precision>
        <size>258</size>
        <nullable>true</nullable>
        <regularAggregate>unsupported</regularAggregate>
        <semiAggregate>unsupported</semiAggregate>
        <collationSequenceLevel>0</collationSequenceLevel>
</queryItem>
<queryItem>
        <name locale="en">NUMVALUE</name>
        ...
</queryItem>
<queryItem>
        <name locale="en">NUMVALUE2</name>
        ...
</queryItem>
<queryItem>
```

```
                <name locale="en">FREQUENCY</name>
                ...
            </queryItem>
            <queryItem>
                <name locale="en">EXPECTEDFREQ</name>
                ...
            </queryItem>
    </querySubject>
    ...
    <querySubject status="valid">
            <name locale="en">BANK_CUSTOMERS_STATS</name>
            <lastChanged>2010-02-22T15:16:13</lastChanged>
            <lastChangedBy>Anonymous</lastChangedBy>
            <definition>
                    <dbQuery>
                            <sources>
                                    <dataSourceRef>[].[dataSources].[DWESAMP
]</dataSourceRef>
                            </sources>
                            <sql type="cognos">
                                    Select
                                    <column>*</column>
                                    from
                                    <table>[DWESAMP].BANK_CUSTOMERS_STA
TS</table>
                            </sql>
                            <tableType>table</tableType>
                    </dbQuery>
            </definition>
            <determinants />
            <queryItem>
                    <name locale="en">ID</name>
                    ...
            </queryItem>
            <queryItem>
                    <name locale="en">NAME</name>
                    ...
            </queryItem>
            <queryItem>
                    <name locale="en">SIZE</name>
                    ...
            </queryItem>
            <queryItem>
                    <name locale="en">HOMOGENEITY</name>
                    ...
```

FIG. 5C

```
            </queryItem>
            <queryItem>
                    <name locale="en">DESCRIPTION</name>
                    ...
            </queryItem>
        </querySubject>
    </namespace>
    <dataSources>
        <dataSource>
            <name>DWESAMP</name>
            <cmDataSource>DWESAMP</cmDataSource>
            <schema>TESTSCHEMA</schema>
            <type>
                    <queryType>relational</queryType>
                    <interface>D2</interface>
            </type>
        </dataSource>
    </dataSources>
    <parameterMaps>
        ...
    </parameterMaps>
    <securityViews>
        ...
    </securityViews>
    <packages>
        <package>
            <name locale="en">BANK_CUSTOMERS_PACKAGE</name>
            ...
        </package>
    </packages>
</project>
```

```
<report xmlns="http://developer.cognos.com/schemas/report/6.0/"
    expressionLocale="en-us">

<modelPath>/content/package[@name='BANK_CUSTOMERS_PACKAGE']/model[
@name='model']</modelPath>
    <layouts>
        <layout>
            <reportPages>

<pageBody>
                        <contents>
                            <textItem>
                                <dataSource>
                                    <staticValue>Default Clustering Report for Model
"BANK_CUSTOMERS"</staticValue>
                                </dataSource>
                                <style>
                                    <CSS value="font-size:14pt" />
                                </style>
                            </textItem>
                            <list horizontalPagination="true" name="List1"
refQuery="QueryList">
                                <style>...</style>
                                <listColumns>
                                    <listColumn>
                                        <listColumnTitle>
                                            <contents>
                                                <textItem>
                                                    <dataSource>
                                                        <dataItemLabel refDataItem="ID" />
```

FIG. 6A

```
                                        </dataSource>
                                    </textItem>
                                </contents>
                            </listColumnTitle>
                            <listColumnBody>
                                <contents>
                                    <textItem>
                                        <dataSource>
                                            <dataItemValue refDataItem="ID" />
                                        </dataSource>
                                        <reportDrills>
                                            <reportDrill name="View cluster details">
                                                <drillLabel>...</drillLabel>
                                                <drillTarget showInNewWindow="true" method="execute">
                                                    <reportPath
                                                        path="/content/package[@name='BANK_CUSTOMERS_PACKAGE']
                                                        /report[@name='BANK_CUSTOMERS_REPORT_Single_
                                                                Cluster']">
                                                        ...
                                                    </reportPath>
                                                    <drillLinks>
                                                        <drillLink>
                                                            <drillTargetContext>
                                                                <parameterContext parameter="ClusterId" />
                                                            </drillTargetContext>
                                                            <drillSourceContext>
                                                                <dataItemContext refDataItem="ID" />
                                                            </drillSourceContext>
                                                        </drillLink>
                                                    </drillLinks>
                                                </drillTarget>
                                            </reportDrill>
                                        </reportDrills>
                                    </textItem>
                                </contents>
                            </listColumnBody>
                        </listColumn>
```

FIG. 6B

```xml
<listColumn>
    <listColumnTitle>
        <contents>
            <textItem>
                <dataSource>
                    <dataItemLabel refDataItem="DESCRIPTION"/>
                </dataSource>
            </textItem>
        </contents>
    </listColumnTitle>
    <listColumnBody>
        <contents>
            <textItem>
                <dataSource>
                    <dataItemValue refDataItem="DESCRIPTION"/>
                </dataSource>
            </textItem>
        </contents>
    </listColumnBody>
</listColumn>
<listColumn>
    <listColumnTitle>
        <contents>
            <textItem>
                <dataSource>
                    <dataItemLabel refDataItem="SIZE"/>
                </dataSource>
            </textItem>
        </contents>
    </listColumnTitle>
    <listColumnBody>
        <contents>
            <textItem>
                <dataSource>
                    <dataItemValue refDataItem="SIZE"/>
                </dataSource>
                <reportDrills>
                    <reportDrill name="View typical records">
                    ...
                    </reportDrill>
                </reportDrills>
```

```xml
            </textItem>
          </contents>
        </listColumnBody>
      </listColumn>

<listColumn>
        <listColumnTitle>
          <contents>
            <textItem>
              <dataSource>

<staticValue>MARITAL_STATUS</staticValue>
              </dataSource>
                <reportDrills>
                  <reportDrill name="View field distribution">
                    ...
                  </reportDrill>
                </reportDrills>
            </textItem>
          </contents>
        </listColumnTitle>
        <listColumnBody>
          <contents>
            <pieChart depth="50" avoidLabelCollision="true"
                showTooltips="true" maxHotspots="10000"
refQuery="QueryChartColumnMARITAL_STATUS"
                name="Pie ChartMARITAL_STATUS">
              <legend>
                ...
              </legend>
              <axisTitle
refQuery="QueryChartColumnMARITAL_STATUS">
                ...
              </axisTitle>
              <pieLabels>
                ...
              </pieLabels>
              <style>...</style>
              ...
              <pieSlices>
                <chartNodes>
                  <chartNode>
                    <chartNodeMembers>
```

```
                                           <chartNodeMember
refDataItem="CATVALUE">
                                                ...
                                           </chartNodeMember>
                                        </chartNodeMembers>
                                     </chartNode>
                                  </chartNodes>
                               </pieSlices>
                               <pies>
                                  <chartNodes>
                                     <chartNode>
                                        <chartNodeMembers>
                                           <chartNodeMember
refDataItem="FREQUENCY">
                                                ...
                                           </chartNodeMember>
                                        </chartNodeMembers>
                                     </chartNode>
                                     <chartNode>
                                        <chartNodeMembers>
                                           <chartNodeMember
refDataItem="EXPECTEDFREQ">
                                                ...
                                           </chartNodeMember>
                                        </chartNodeMembers>
                                     </chartNode>
                                  </chartNodes>
                               </pies>
                               <reportDrills>
                                  <reportDrill name="Show detail view">
                                       ...
                                  </reportDrill>
                               </reportDrills>
                            </pieChart>
                         </contents>
                      </listColumnBody>
                   </listColumn>
                   ...
                   ( other columns ...)
                   ...
                   <listColumn>
                      <listColumnTitle>
                         <contents>
                            <textItem>
                               <dataSource>
```

```xml
                                        <staticValue>AGE</staticValue>
                                    </dataSource>
                                    <reportDrills>
                                        <reportDrill name="View field distribution">
                                            ...
                                        </reportDrill>
                                    </reportDrills>
                                </textItem>
                            </contents>
                        </listColumnTitle>
                        <listColumnBody>
                            <contents>
                                <combinationChart depth="50"
showTooltips="true"
                                    maxHotspots="10000"
refQuery="QueryChartColumnAGE"
   name="Combination ChartAGE">

<legend>
                                        <legendPosition>
                                            <relativePosition />
                                        </legendPosition>
                                        <legendTitle
refQuery="QueryChartColumnAGE">
                                            ...
                                        </legendTitle>
                                    </legend>
                                    <ordinalAxis>
                                        <axisTitle
refQuery="QueryChartColumnAGE">
                                        </axisTitle>
                                        <axisLine color="black" />
                                    </ordinalAxis>
                                    <numericalAxisY1
sameRangeAllInstances="false">
                                        <axisTitle
refQuery="QueryChartColumnAGE">
                                            <chartContents>
                                                <chartTextItem>
                                                    <dataSource>
   <staticValue>Frequency</staticValue>
                                                    </dataSource>
                                                </chartTextItem>
                                            </chartContents>
                                        </axisTitle>
```

FIG. 6F

```
                                        </numericalAxisY1>
                                        <combinationChartTypes>
                                            <bar>
                                                <chartNodes>
                                                    <chartNode>
                                                        <chartNodeMembers>
                                                            <chartNodeMember
refDataItem="FREQUENCY">
                                                                ...
                                                            </chartNodeMember>
                                                        </chartNodeMembers>
                                                    </chartNode>
                                                </chartNodes>
                                            </bar>
                                            <bar>
                                                <chartNodes>
                                                    <chartNode>
                                                        <chartNodeMembers>
                                                            <chartNodeMember
refDataItem="EXPECTEDFREQ">
                                                                ...
                                                            </chartNodeMember>
                                                        </chartNodeMembers>
                                                    </chartNode>
                                                </chartNodes>
                                            </bar>
                                        </combinationChartTypes>
                                        <style>
                                            ...
                                        </style>
                                        <commonClusters>
                                            <chartNodes>
                                                <chartNode>
                                                    <chartNodeMembers>
                                                        <chartNodeMember
refDataItem="NUMVALUE">
                                                            ...
                                                        </chartNodeMember>
                                                    </chartNodeMembers>
                                                </chartNode>
                                            </chartNodes>
                                        </commonClusters>
                                        ...
                                        <reportDrills>
                                            <reportDrill name="Show detail view">
```

FIG. 6G

```xml
            ...
                        </reportDrill>
                    </reportDrills>
                </combinationChart>
            </contents>
        </listColumnBody>
    </listColumn>
</listColumns>
<sortList>
    <sortItem refDataItem="SIZE" sortOrder="descending" />
</sortList>
                        </list>
                    </contents>
                </pageBody>

</reportPages>
        <promptPages>

<pageHeader>...</pageHeader>
                <pageBody>
                    <contents>
                        <textBox parameter="MARITAL_STATUSParameter">
                            <defaultSelections>

<defaultSimpleSelection>MARITAL_STATUS</defaultSimpleSelection>
                            </defaultSelections>
                        </textBox>
                        ...
                        (other parameters)
                        ...
                        <textBox parameter="AGEParameter">
                            <defaultSelections>
                                <defaultSimpleSelection>AGE</defaultSimpleSelection>
                            </defaultSelections>
                        </textBox>
                    </contents>
                    <style>...</style>
                </pageBody>
                <pageFooter>...</pageFooter>
                <style>...</style>

</promptPages>
    </layout>
</layouts>
...
```

FIG. 6H

```xml
<queries>
    <query name="QueryList">
        <source>
            <model />
        </source>
        <selection>
            <dataItem name="ID" aggregate="none" rollupAggregate="none">
                <expression>[BANK_CUSTOMERS_NS].[BANK_CUSTOMERS_STATS].[ID]
                </expression>
            </dataItem>
            <dataItem name="DESCRIPTION" aggregate="none"
                rollupAggregate="none">
                <expression>[BANK_CUSTOMERS_NS].[BANK_CUSTOMERS_STATS].[DESCRIPTION]
                </expression>
            </dataItem>
            <dataItem name="SIZE" aggregate="none" rollupAggregate="none">
                <expression>[BANK_CUSTOMERS_NS].[BANK_CUSTOMERS_STATS].[SIZE]
                </expression>
            </dataItem>
        </selection>
    </query>
    <query name="QueryChartColumnMARITAL_STATUS">
        <source>
            <model />
        </source>
        <selection>
            <dataItem name="ID" aggregate="none" rollupAggregate="none">
                <expression>[BANK_CUSTOMERS_NS].[BANK_CUSTOMERS_DISTR].[ID]
                </expression>
            </dataItem>
            <dataItem name="FIELDNAME" aggregate="none"
                rollupAggregate="none">
                <expression>[BANK_CUSTOMERS_NS].[BANK_CUSTOMERS_DISTR].[FIELDNAME]
                </expression>
            </dataItem>
            <dataItem name="FREQUENCY" aggregate="total" label="Cluster">
                <expression>[BANK_CUSTOMERS_NS].[BANK_CUSTOMERS_DISTR].[FREQUENCY]
                </expression>
            </dataItem>
```

```xml
            <dataItem name="EXPECTEDFREQ" aggregate="total" label="Whole popul.">
                <expression>[BANK_CUSTOMERS_NS].[BANK_CUSTOMERS_DISTR].[EXPECTEDFREQ]
                </expression>
            </dataItem>
            <dataItem name="CATVALUE" aggregate="none" rollupAggregate="none"
                label="MARITAL_STATUS">
                <expression>[BANK_CUSTOMERS_NS].[BANK_CUSTOMERS_DISTR].[CATVALUE]
                </expression>
            </dataItem>
        </selection>
        <detailFilters>
            <detailFilter use="required" postAutoAggregation="false">
                <filterExpression>[FIELDNAME]= 'MARITAL_STATUS' and [CATVALUE]
                    is not null</filterExpression>
            </detailFilter>
        </detailFilters>
    </query>
    ...
    (other queries...)
    ...
    <query name="QueryChartColumnAGE">
        <source>
            <model />
        </source>
        <selection>
            <dataItem name="ID" aggregate="none" rollupAggregate="none">
                <expression>[BANK_CUSTOMERS_NS].[BANK_CUSTOMERS_DISTR].[ID]
                </expression>
            </dataItem>
            <dataItem name="FIELDNAME" aggregate="none"
                rollupAggregate="none">
                <expression>[BANK_CUSTOMERS_NS].[BANK_CUSTOMERS_DISTR].[FIELDNAME]
                </expression>
            </dataItem>
            <dataItem name="FREQUENCY" aggregate="total" label="Cluster">
                <expression>[BANK_CUSTOMERS_NS].[BANK_CUSTOMERS_DISTR].[FREQUENCY]
                </expression>
```

```
            </dataItem>
            <dataItem name="EXPECTEDFREQ" aggregate="total" label="Whole
popul.">
                <expression>[BANK_CUSTOMERS_NS].
[BANK_CUSTOMERS_DISTR].[EXPECTEDFREQ]
                </expression>
            </dataItem>
            <dataItem name="NUMVALUE" aggregate="none" label="AGE">
                <expression>[BANK_CUSTOMERS_NS].
[BANK_CUSTOMERS_DISTR].[NUMVALUE]
                </expression>
            </dataItem>
        </selection>
        <detailFilters>
            <detailFilter use="required" postAutoAggregation="false">
                <filterExpression>[FIELDNAME]= 'AGE' and [NUMVALUE]
                    is not null</filterExpression>
            </detailFilter>
        </detailFilters>
    </query>

</queries>
</report>
```

FIG. 6K

```
                                                                    700
                                                                    /
CREATE PROCEDURE CUSTOMER_SEGMENTATION ( IN MAX_CLUSTERS INTEGER
)
     DYNAMIC RESULT SETS 1
------------------------------------------------------------------------
-- SQL Stored Procedure
------------------------------------------------------------------------
P1: BEGIN
     -- Declare cursor
     DECLARE cursor1 CURSOR WITH RETURN FOR
          SELECT PROCSCHEMA, PROCNAME FROM SYSCAT.PROCEDURES;

--SET CURRENT SCHEMA "IWSCHEMA83A9EC";

CREATE VIEW INPUT_08_0 AS
  SELECT
    "CLIENT_ID" AS "CLIENT_ID",
    "AGE" AS "AGE",
    "GENDER" AS "GENDER",
    "MARITAL_STATUS" AS "MARITAL_STATUS",
    "PROFESSION" AS "PROFESSION",
    "NBR_YEARS_CLI" AS "NBR_YEARS_CLI",
    "SAVINGS_ACCOUNT" AS "SAVINGS_ACCOUNT",
    "ONLINE_ACCESS" AS "ONLINE_ACCESS",
    "JOINED_ACCOUNTS" AS "JOINED_ACCOUNTS",
    "BANKCARD" AS "BANKCARD",
    "AVERAGE_BALANCE" AS "AVERAGE_BALANCE"
  FROM "BANK"."BANKCUSTOMERS" TABLESAMPLE SYSTEM(20.0)
REPEATABLE(3);
```

```
CALL IDMMX.BuildClusModel('IM_CLUSTER_08',
                          'INPUT_08_0', 'DM_setAlgorithm(''Demographic''),DM_setMaxNumClus('||MAX_CLUSTE
RS||')');

CREATE VIEW $MODELPORT$INPUT_010_0 (
  $LOC$MODEL,
  $LOC$TABLENAME,
  $LOC$MODELCOLNAME,
  $LOC$IDCOLNAME,
  $LOC$ID) AS
  (SELECT MODEL, 'IDMMX.CLUSTERMODELS', 'MODEL', 'MODELNAME',
MODELNAME
     FROM IDMMX.CLUSTERMODELS
     WHERE MODELNAME = 'IM_CLUSTER_08');

CREATE VIEW CLUSTER_EXTRACT_CLUSTERS_010 AS
  (SELECT CLUSTER.ID, CLUSTER.NAME, CLUSTER.SIZE,
CLUSTER.HOMOGENEITY, CLUSTER.DESCRIPTION
 FROM $MODELPORT$INPUT_010_0 AS MODEL, TABLE
(IDMMX.DM_GETCLUSTERS(MODEL.$LOC$MODEL)) CLUSTER);

select * from CLUSTER_EXTRACT_CLUSTERS_010 fetch first 1000 rows
only;

DROP VIEW CLUSTER_EXTRACT_CLUSTERS_010;

DROP VIEW $MODELPORT$INPUT_010_0;

DROP VIEW INPUT_08_0;

-- Cursor left open for client application
    OPEN cursor1;
END P1
```

FIG. 7B

```
<?xml version="1.0" encoding="UTF-8"?>
<bmtactionlog timestamp="20091005002832546" user="Administrator"
version="8.4.2230.0">
...
<transaction saved="true" seq="2" timestamp="20091005001549125"
uniqueId="B5E246EDB5E246ED">
 <action seq="1" type="SetActiveLocale">
...
</transaction>
<transaction saved="true" seq="3" timestamp="20091005001549218"
uniqueId="FEB1483BFEB1483B">
 <action seq="1" type="Modify">
...
<transaction saved="true" seq="4" timestamp="20091005001549281"
uniqueId="57A5F86B57A5F86B">
 <action seq="1" type="Modify">
  <inputparams>
   <param seq="1" type="handle">
    <mappingpath>namespace/name</mappingpath>
    <value>/O/name[0]/O/[Model]</value>
   </param>
   <param seq="2" type="i18nstring">
    <value>$Namespace</value>
   </param>
  </inputparams>
  <domchanges />
  <result success="t">
   <outputparams />
  </result>
 </action>
 <action seq="2" type="DBImport">
  <inputparams>
   <param seq="1" type="handle">
    <mappingpath>namespace</mappingpath>
    <value>[$Namespace]</value>
   </param>
   <param seq="2" type="cclnode">
    <value><![CDATA[<item Name="$DataSource" Type="database" Value="partial"
dbType="D2" isSystem="false"><item Name="$Schema" Type="schema"
Value="partial"><item Name="Tables" Type="tables" Value="true"><item
Name="$DistributionTable" Type="table" Value="true"/><item
Name="$StatisticsTable" Type="table"
Value="true"/>#if(${DrillThroughDataAvailable})<item
Name="$DrillThroughDataTableNameWithoutSchema" Type="table"
Value="true"/>#end</item></item></item>]]></value>
```

FIG. 9A

```xml
   </param>
   ...
  </action>
  <action seq="3" type="DBRelease">
   ...
  </action>
 </transaction>
 ...
 <transaction saved="true" seq="6" timestamp="20091005001834265"
  uniqueId="5AADA8AB5AADA8AB">
  <action seq="1" type="Modify">
   ...
  <action seq="2" type="Modify">
   ...
  <action seq="3" type="Modify">
   ...
  <action seq="4" type="Modify">
   ...
  <action seq="5" type="Modify">
   ...
 <transaction saved="false" seq="7" timestamp="20091005001853703"
  uniqueId="9D881BEB9D881BEB">
  <action seq="1" type="Create">
   <inputparams>
    <param seq="1" type="integer">
     <value>16</value>
    </param>
    <param seq="2" type="handle">
     <mappingpath>securityViews</mappingpath>
     <value>[].[securityViews]</value>
    </param>
    <param seq="3" type="i18nstring">
     <value>$Package</value>
    </param>
    <param seq="4" type="integer">
     <value>1</value>
    </param>
   </inputparams>
   <domchanges />
   <result success="t">
    <outputparams />
   </result>
  </action>
  <action seq="2" type="SetSecurityViewDefinition">
   ...
  </action>
```

```
<action seq="3" type="Create">
...
<action seq="4" type="SetSecurityViewDefinition">
...
</action>
<action seq="5" type="SetPackageLocales">
...
</action>
<action seq="6" type="Modify">
...
<action seq="8" type="SetSecurityViewAccess">
...
</action>
<action seq="9" type="SetSecurityViewAccess">
...
</action>
<action seq="10" type="UpdateObject">
 <inputparams>
  <param seq="1" type="handle">
   <mappingpath>securityView</mappingpath>
   <value>[].[securityViews].[$Package]
   </value>
  </param>
  <param seq="2" type="cclnode">
   <value><![CDATA[<updateObjectRequest><tasks><task
name="addProperty"><parameters><param name="propertyType"
value="functionSet"/><param name="propertyValue"
value="V_DB2"/></parameters></task><task
name="addProperty"><parameters><param name="propertyType"
value="functionSet"/><param name="propertyValue"
value="V_Informix"/></parameters></task><task
name="addProperty"><parameters><param name="propertyType"
value="functionSet"/><param name="propertyValue"
value="V_MSAccess"/></parameters></task><task
name="addProperty"><parameters><param name="propertyType"
value="functionSet"/><param name="propertyValue"
value="V_Oracle"/></parameters></task><task
name="addProperty"><parameters><param name="propertyType"
value="functionSet"/><param name="propertyValue"
value="V_Redbrick"/></parameters></task><task
name="addProperty"><parameters><param name="propertyType"
value="functionSet"/><param name="propertyValue"
value="V_SQLServer"/></parameters></task><task
name="addProperty"><parameters><param name="propertyType"
value="functionSet"/><param name="propertyValue"
value="V_Teradata"/></parameters></task><task
```

FIG. 9C

```
name="addProperty"><parameters><param name="propertyType"
value="functionSet"/><param name="propertyValue"
value="V_SAPBW"/></parameters></task><task
name="addProperty"><parameters><param name="propertyType"
value="functionSet"/><param name="propertyValue"
value="V_Sybase"/></parameters></task></tasks></updateObjectRequest>]]></value>
   </param>
   </inputparams>
   <domchanges />
   <result success="t">
   <outputparams />
   </result>
  </action>
  <action seq="11" type="SetSecurityViewAccess">
  ...
  </action>
  <action seq="12" type="SetSecurityViewAccess">
  ...
  </action>
  <action seq="13" type="Publish">
   <inputparams>
    <param seq="1" type="handle">
     <mappingpath>package</mappingpath>
     <value>[].[packages].[$Package]</value>
    </param>
    <param seq="2" type="integer">
     <value>2</value>
    </param>
    <param seq="3" type="i18nstring">
     <value>$SearchPath</value>
    </param>
    <param seq="4" type="i18nstring">
     <value>$Package</value>
    </param>
   ...
   </inputparams>
   <domchanges />
   <result success="t">
   <outputparams />
   </result>
  </action>
 </transaction>
 <transaction saved="true" seq="8" timestamp="20100511175444666"
  uniqueId="C8490285C8490285">
  <action seq="1" type="SetActiveLocale">
  ...
```

```
<transaction saved="true" seq="9" timestamp="20100511175522739"
 uniqueId="79CF965B79CF965B">
 <action seq="1" type="UpdateObject">
 ...
<action seq="2" type="FindOrCreateDataSource">
  <inputparams>
   <param seq="1" type="i18nstring">
    <value />
   </param>
   <param seq="2" type="i18nstring">
    <value>$DataSource</value>
   </param>
   <param seq="3" type="i18nstring">
    <value />
   </param>
   <param seq="4" type="i18nstring">
    <value>$Schema</value>
   </param>
  </inputparams>
  <domchanges />
  <result success="t">
   <outputparams />
  </result>
 </action>
<action seq="3" type="SetStoredProcedureType">
  <inputparams>
   <param seq="1" type="handle">
    <mappingpath>querySubject</mappingpath>
    <value>[$Namespace].[New Query Subject]</value>
   </param>
   <param seq="2" type="integer">
    <value>0</value>
   </param>
  </inputparams>
  <domchanges />
  <result success="t">
   <outputparams />
  </result>
 </action>
 <action seq="4" type="ModifyComplex">
  <inputparams>
   <param seq="1" type="handle">
    <mappingpath>querySubject/definition
    </mappingpath>
    <value>/O/definition[0]/O/[$Namespace].[New
    Query Subject]</value>
```

FIG. 9E

```
        </param>
        <param seq="2" type="cclnode">
<value><![CDATA[<storedProcedure><dataSourceRef>[].[dataSources].
[$DataSource]</dataSourceRef><canonicalName>$DynAssocProcedureName</canonica
lName><type>querySubject</type><procParameters><procParameter><parameterName
>SUPPORT</parameterName><mode>in</mode><datatype>float64</datatype><precisi
on>0</precision><scale>0</scale><size>8</size><value>#
prompt('supportParam',,'float',,'2.0')#</value></pr
ocParameter><procParameter><parameterName>CONFIDENCE</parameterName><mo
de>in</mode><datatype>float64</datatype><precision>0</precision><scale>0</scale>
<size>8</size><value>#
prompt('confidenceParam',,'float',,'30')#</value><
/procParameter><procParameter><parameterName>CLUSTERID</parameterName><m
ode>in</mode><datatype>int32</datatype><precision>0</precision><scale>0</scale><
size>4</size><value>#
prompt('clusterIDParam')#</value></procParameter></procParameters></s
toredProcedure>]]></value>
        </param>
      </inputparams>
      <domchanges />
      <result success="f">
       <outputparams />
      </result>
     </action>
     <action seq="5" type="SetPromptValue">
      <inputparams>
        <param seq="1" type="i18nstring">
          <value>clusterIDParam</value>
        </param>
        <param seq="2" type="cclnode">
          <value><![CDATA[<item xmlns:SOAP-
ENC="http://schemas.xmlsoap.org/soap/encoding/"
xmlns:bus="http://developer.cognos.com/schemas/bibus/3/"
xmlns:xsi="http://www.w3.org/2001/XMLSchema-
instance"><name>clusterIDParam</name><type>xsdString</type><value><item
xsi:type="bus:simpleParmValueItem"><inclusive>true</inclusive><use>1</use></item>
</value></item>]]></value>
        </param>
      </inputparams>
      <domchanges />
      <result success="t">
       <outputparams />
      </result>
     </action>
     <action seq="6" type="SetPromptValue">
      <inputparams>
```

```xml
  <param seq="1" type="i18nstring">
   <value>confidenceParam</value>
  </param>
  <param seq="2" type="cclnode">
...
 <action seq="7" type="SetPromptValue">
  <inputparams>
   <param seq="1" type="i18nstring">
    <value>supportParam</value>
   </param>
   <param seq="2" type="cclnode">
...
 <action seq="8" type="ResetPromptValues">
  <inputparams>
   <param seq="1" type="integer">
    <value>0</value>
   </param>
  </inputparams>
  <domchanges />
  <result success="t">
   <outputparams />
  </result>
 </action>
 <action seq="9" type="ModifyComplex">
...
 <action seq="10" type="SetStoredProcedureType">
  <inputparams>
   <param seq="1" type="handle">
    <mappingpath>querySubject</mappingpath>
    <value>[$Namespace].[New Query Subject]</value>
   </param>
   <param seq="2" type="integer">
    <value>0</value>
   </param>
  </inputparams>
  <domchanges />
  <result success="t">
   <outputparams />
  </result>
 </action>
 <action seq="11" type="ModifyComplex">
...
 <action seq="12" type="ResetPromptValues">
...
 <action seq="13" type="ResetPromptValues">
...
```

FIG. 9G

```
<action seq="14" type="SetPromptValue">
...
<action seq="15" type="SetPromptValue">
...
<action seq="16" type="SetPromptValue">
...
<action seq="17" type="ResetPromptValues">
...
<action seq="18" type="SetStoredProcedureType">
 <inputparams>
  <param seq="1" type="handle">
   <mappingpath>querySubject</mappingpath>
   <value>[$Namespace].[New Query Subject]</value>
  </param>
  <param seq="2" type="integer">
   <value>0</value>
  </param>
 </inputparams>
 <domchanges />
 <result success="t">
  <outputparams />
 </result>
</action>
<action seq="19" type="ModifyComplex">
...
<action seq="20" type="EvaluateObject">
 <inputparams>
  <param seq="1" type="handle">
   <mappingpath>querySubject</mappingpath>
   <value>[$Namespace].[New Query Subject]</value>
  </param>
 </inputparams>
 <domchanges />
 <result success="t">
  <outputparams />
 </result>
</action>
<action seq="21" type="DBRelease">
 <inputparams />
 <domchanges />
 <result success="t">
  <outputparams />
 </result>
</action>
</transaction>
<transaction saved="true" seq="10" timestamp="20100511180851755"
```

FIG. 9H

```
uniqueId="E3B8DA5BE3B8DA5B">
<action seq="1" type="Modify">
 <inputparams>
  <param seq="1" type="handle">
   <mappingpath>querySubject/name</mappingpath>
   <value>/O/name[0]/O/[$Namespace].[New
   Query Subject]</value>
  </param>
  <param seq="2" type="i18nstring">
   <value>DynamicAssocRules</value>
  </param>
 </inputparams>
 <domchanges />
 <result success="t">
  <outputparams />
 </result>
</action>
</transaction>
</bmtactionlog>
```

```
<report xmlns="http://developer.cognos.com/schemas/report/6.0/"
expressionLocale="en-us">
<modelPath>${ModelSearchPath}</modelPath>
<drillBehavior modelBasedDrillThru="true" />
<layouts>
 <layout>
  <reportPages>

<style>
    ...
    </style>
    <pageBody>
     <style>
     ...
     </style>
     <contents>
      <textItem>
       <dataSource>
        <staticValue>Default Clustering Report for Model "${MiningModelName}"
        </staticValue>
       </dataSource>
       ....
      </textItem>
      <list horizontalPagination="true" name="List1" refQuery="QueryList">
       <style>
       ...
       </style>
       <listColumns>
        <listColumn>
         <listColumnTitle>
          <style>
          ...
          </style>
          <contents>
           <textItem>
            <dataSource>
             <dataItemLabel refDataItem="ID" />
            </dataSource>
           </textItem>
          </contents>
         </listColumnTitle>
         <listColumnBody>
          <style>
          ...
          </style>
          <contents>
```

```xml
<textItem>
 <dataSource>
  <dataItemValue refDataItem="ID" />
 </dataSource>
 <style>
 ...
 </style>
 <reportDrills>
  <reportDrill name="View cluster details">
   <drillLabel>
    <dataSource>
     <staticValue />
    </dataSource>
   </drillLabel>
   <drillTarget showInNewWindow="true" method="execute">
    <reportPath path="${SingleClusterReportSearchPath}">
     <XMLAttributes>
      <XMLAttribute name="ReportName"
       value="SingleClusterReport" output="no" />
      <XMLAttribute name="class" value="report"
       output="no" />
     </XMLAttributes>
    </reportPath>
    <drillLinks>
     <drillLink>
      <drillTargetContext>
       <parameterContext parameter="ClusterId" />
      </drillTargetContext>
      <drillSourceContext>
       <dataItemContext refDataItem="ID" />
      </drillSourceContext>
     </drillLink>
    </drillLinks>
   </drillTarget>
  </reportDrill>
 </reportDrills>
</textItem>
</contents>
</listColumnBody>
</listColumn>
<listColumn>
 <listColumnTitle>
  <style>
   <defaultStyles>
    <defaultStyle refStyle="lt" />
   </defaultStyles>
```

FIG. 10B

```
</style>
<contents>
 <textItem>
  <dataSource>
   <dataItemLabel refDataItem="DESCRIPTION" />
  </dataSource>
 </textItem>
</contents>
</listColumnTitle>
<listColumnBody>
<style>
...
</style>
<contents>
 <textItem>
  <dataSource>
   <dataItemValue refDataItem="DESCRIPTION" />
  </dataSource>
 </textItem>
</contents>
</listColumnBody>
</listColumn>
<listColumn>
<listColumnTitle>
 <style>
  <defaultStyles>
   <defaultStyle refStyle="lt" />
  </defaultStyles>
 </style>
 <contents>
  <textItem>
   <dataSource>
    <dataItemLabel refDataItem="SIZE" />
   </dataSource>
  </textItem>
 </contents>
</listColumnTitle>
<listColumnBody>
 <style>
  <defaultStyles>
   <defaultStyle refStyle="lc" />
  </defaultStyles>
 </style>
 <contents>
  <textItem>
   <dataSource>
```

```
    <dataItemValue refDataItem="SIZE" />
   </dataSource>
  #if( ${DrillThroughDataAvailable})
  <reportDrills>
   <reportDrill name="View typical records">
    <drillLabel>
     <dataSource>
      <staticValue />
     </dataSource>
    </drillLabel>
    <drillTarget showInNewWindow="true" method="execute">
     <reportPath path="${DrillThroughDataReportSearchPath}">
      <XMLAttributes>
       <XMLAttribute name="ReportName"
        value="ClusterDrillThroughData" output="no" />
       <XMLAttribute name="class" value="report"
        output="no" />
      </XMLAttributes>
     </reportPath>
     <drillLinks>
      <drillLink>
       <drillTargetContext>
        <parameterContext parameter="ClusterIdParam" />
       </drillTargetContext>
       <drillSourceContext>
        <dataItemContext refDataItem="ID" />
       </drillSourceContext>
      </drillLink>
     </drillLinks>
    </drillTarget>
   </reportDrill>
  </reportDrills>
  #end
  </textItem>
 </contents>
</listColumnBody>
</listColumn>
#foreach( $Column in $ColumnList )
<listColumn>
 <listColumnTitle>
  <style>
   ...
  </style>
  <contents>
   <textItem>
    <dataSource>
```

```
        <staticValue>${Column.ColumnName}</staticValue>
       </dataSource>
       <reportDrills>
       <reportDrill name="View field distribution">
        <drillLabel>
         <dataSource>
          <staticValue />
         </dataSource>
        </drillLabel>
        <drillTarget showInNewWindow="true">
        #if( ${Column.isCategorical()})
        <reportPath path="$FieldReportCategoricalSearchPath">
         <XMLAttributes>
          <XMLAttribute name="ReportName" value="FieldDetailsCategorical"
            output="no" />
          <XMLAttribute name="class" value="report" output="no" />
         </XMLAttributes>
        </reportPath>#else<reportPath path="$FieldReportNumericalSearchPath">
         <XMLAttributes>
          <XMLAttribute name="ReportName" value="FieldDetailsNumerical"
            output="no" />
          <XMLAttribute name="class" value="report" output="no" />
         </XMLAttributes>
        </reportPath>#end<drillLinks>
         <drillLink>
          <drillTargetContext>
           <parameterContext parameter="ColumnNameParam" />
          </drillTargetContext>
          <drillSourceContext>
           <parameterContext parameter="${Column.ColumnName}Parameter" />
          </drillSourceContext>
         </drillLink>
        </drillLinks>
       </drillTarget>
      </reportDrill>
     </reportDrills>
    </textItem>
   </contents>
  </listColumnTitle>
  <listColumnBody>
...
  <reportDrills>
       <reportDrill name="Show detail view">
        <drillLabel>
         <dataSource>
          <staticValue />
```

FIG. 10E

```xml
</dataSource>
</drillLabel>
<drillTarget showInNewWindow="true">
<reportPath
 path="${DetailReportCategoricalSearchPath}">
 <XMLAttributes>
  <XMLAttribute name="ReportName"
   value="ClusterDetailsCategorical" output="no" />
  <XMLAttribute name="class" value="report"
   output="no" />
 </XMLAttributes>
</reportPath>
<drillLinks>
 <drillLink>
  <drillTargetContext>
   <parameterContext parameter="clusterid" />
  </drillTargetContext>
  <drillSourceContext>
   <dataItemContext refDataItem="ID" />
  </drillSourceContext>
 </drillLink>
 <drillLink>
  <drillTargetContext>
   <parameterContext parameter="fieldname" />
  </drillTargetContext>
  <drillSourceContext>
   <parameterContext parameter="${Column.ColumnName}Parameter" />
  </drillSourceContext>
 </drillLink>
</drillLinks>
</drillTarget>
</reportDrill>
</reportDrills>
</pieChart>
#else
<combinationChart depth="50" showTooltips="true"
 maxHotspots="10000" refQuery="QueryChartColumn${Column.ColumnName}" name="Combination Chart${Column.ColumnName}">
 <legend>
  <legendPosition>
   <relativePosition />
  </legendPosition>
  <legendTitle refQuery="QueryChartColumn${Column.ColumnName}">
   ...
  </legendTitle>
  <style>
```

```
    ...
    </style>
   </legend>
   <ordinalAxis>
    <axisTitle refQuery="QueryChartColumn${Column.ColumnName}">
    ...
    </axisTitle>
    <axisLine color="black" />
    ...
   </ordinalAxis>
   <numericalAxisY1 sameRangeAllInstances="false">
    <axisTitle refQuery="QueryChartColumn${Column.ColumnName}">
     <style>
     ...
     </style>
     <chartContents>
      <chartTextItem>
       <dataSource>
        <staticValue>Frequency</staticValue>
       </dataSource>
      </chartTextItem>
     </chartContents>
    </axisTitle>
    <gridlines color="#cccccc" />
    <axisLine color="black" />
    <style>
    ...
    </style>
   </numericalAxisY1>
   <combinationChartTypes>
...
   <masterDetailLinks>
...

<reportDrills>
    <reportDrill name="Show detail view">
    ...
   </combinationChart>
   #end
  </contents>
 </listColumnBody>
</listColumn>
#end
</listColumns>
<sortList>
 <sortItem refDataItem="SIZE" sortOrder="descending" />
```

```
      </sortList>
     </list>
    </contents>
   </pageBody>

</reportPages>
 <promptPages>
...
 </promptPages>
</layout>
</layouts>
<XMLAttributes>
<XMLAttribute name="RS_CreateExtendedDataItems" value="true"
 output="no" />
<XMLAttribute name="listSeparator" value="," output="no" />
</XMLAttributes>
<queries>
 <query name="QueryList">
  <source>
   <model />
  </source>
  <selection>
   <dataItem name="ID" aggregate="none" rollupAggregate="none">
    <expression>[$Namespace].[${StatisticsTable}].[ID]
    </expression>
   </dataItem>
   <dataItem name="DESCRIPTION" aggregate="none"
    rollupAggregate="none">
    <expression>[$Namespace].[${StatisticsTable}].[DESCRIPTION]
    </expression>
   </dataItem>
   <dataItem name="SIZE" aggregate="none" rollupAggregate="none">
    <expression>[$Namespace].[${StatisticsTable}].[SIZE]
    </expression>
   </dataItem>
  </selection>
 </query>
#foreach( $Column in $ColumnList )
<query name="QueryChartColumn${Column.ColumnName}">
 <source>
  <model />
 </source>
 <selection>
  <dataItem name="ID" aggregate="none" rollupAggregate="none">
   <expression>[$Namespace].[${DistributionTable}].[ID]
   </expression>
```

FIG. 10H

```
</dataItem>
<dataItem name="FIELDNAME" aggregate="none"
rollupAggregate="none">
  <expression>[$Namespace].[${DistributionTable}].[FIELDNAME]
  </expression>
</dataItem>
<dataItem name="FREQUENCY" aggregate="total" label="Cluster">
  <expression>[$Namespace].[${DistributionTable}].[FREQUENCY]
  </expression>
</dataItem>
<dataItem name="EXPECTEDFREQ" aggregate="total" label="Whole popul.">
  <expression>[$Namespace].[${DistributionTable}].[EXPECTEDFREQ]
  </expression>
</dataItem>
#if( ${Column.isCategorical()})
<dataItem name="CATVALUE" aggregate="none" rollupAggregate="none"
label="${Column.ColumnName}">
  <expression>[$Namespace].[${DistributionTable}].[CATVALUE]
  </expression>
</dataItem>
#else
<dataItem name="NUMVALUE" aggregate="none" label="$
{Column.ColumnName}">
  <expression>[$Namespace].[${DistributionTable}].[NUMVALUE]
  </expression>
</dataItem>
#end
</selection>
<detailFilters>
<detailFilter use="required" postAutoAggregation="false">
  <filterExpression>[FIELDNAME]= '${Column.ColumnName}' and
[${Column.DataType}]
     is not null</filterExpression>
</detailFilter>
</detailFilters>
</query>
#end
</queries>
</report>
```

DEPLOYMENT OF A BUSINESS INTELLIGENCE (BI) META MODEL AND A BI REPORT SPECIFICATION FOR USE IN PRESENTING DATA MINING AND PREDICTIVE INSIGHTS USING BI TOOLS

BACKGROUND

1. Field

Embodiments of the invention relate to fast, dynamic, data-driven report deployment of data mining and predictive insight into Business Intelligence (BI) tools.

2. Description of the Related Art

Data mining results and insights are different from data that is typically stored in flat table structures. Therefore, the data mining results and insights are mostly stored as data mining models (also referred to as "mining models") in hierarchical ways in large documents (e.g. standardized Predictive Model Markup Language (PMML) format). However, many conventional Business Intelligence (BI) tools can not consume those data mining models. BI tools may be described as analyzing data and presenting reports (e.g. report design tools). Therefore, the mining results and insights need to be transformed to a form that is consumable by the BI tools.

Few vendors provide dedicated BI tools (e.g. report design tools) in which a report designer can manually create mining results and insights reports (i.e. mining reports). Because vendors do not provide dedicated BI tools, the user has to transform mining results and insights into a form consumable by the BI Tools. Further, deep data mining knowledge is required to create reports with the general BI tools. Nevertheless, the creation of such reports is a tedious task and changes in the underlying data result in long lasting manual changes. Further, the task of transforming the mining results and insights and creating the reports and meta information requires deep knowledge in the involved tools and software, as well as, deep mining skills to know how to visualize those mining insights.

Known solutions are based on exporting images that were generated within the mining tool. Then, the images are incorporated into the report in a static manner (e.g. similar to using an image within a web page). However, this is a very static and non-interactive way. Further, this solution does not provide automatic deployment of the mining results and insights.

Most tools do not allow visualizing standardized data mining models natively. Thus, such tools are less flexible and restrict the visualization to predefined graphics.

BRIEF SUMMARY

Provided are techniques for processing Business Intelligence (BI) reports. A set of BI meta model templates and BI report specification templates are provided. A Business Intelligence (BI) meta model template is selected from the set of BI meta model templates based on one or more meta model object types in a model structure. A BI meta model is generated from the selected BI meta model template. One or more BI report specification templates are selected from the set of BI report specification templates based on a mining model type. A BI report specification is generated from the selected one or more BI report specification templates, a schema of the model structure, and content of the model structure. The BI meta model and the BI report specification are deployed to a BI server for use in generating a BI report using a BI tool at the BI server. In response to a user request for a BI report, the BI report is generated with a BI tool at the BI server that uses the BI meta model and the BI report specification.

BRIEF DESCRIPTION OF THE SEVERAL VIEWS OF THE DRAWINGS

Referring now to the drawings in which like reference numbers represent corresponding parts throughout:

FIG. 2 illustrates a partial example of an input data table in accordance with certain embodiments.

FIG. 3 illustrates a partial example of a mining model in PMML format in accordance with certain embodiments. FIG. 3 is formed by FIGS. 3A, 3B, and 3C.

FIG. 4 illustrates a partial example of a model table in accordance with certain embodiments.

FIG. 5 illustrates an example of a BI meta model in accordance with certain embodiments. FIG. 5 is formed by FIGS. 5A, 5B, 5C, and 5D.

FIG. 6 illustrates an example of a report specification in accordance with certain embodiments. FIG. 6 is formed by FIGS. 6A, 6B, 6C, 6D, 6E, 6F, 6G, 6H, 6I, 6J, and 6K.

FIG. 7 illustrates a partial example of a stored procedure in accordance with certain embodiments. FIG. 7 is formed by FIGS. 7A and 7B.

FIG. 9 illustrates an example BI meta model template in accordance with certain embodiments. FIG. 9 is formed by FIGS. 9A, 9B, 9C, 9D, 9E, 9F, 9G, 9H, and 9I.

FIG. 10 illustrates an example BI report specification template in accordance with certain embodiments. FIG. 10 is formed by FIGS. 10A, 10B, 10C, 10D, 10E, 10F, 10G, 10H, and 10I.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Figure 1:
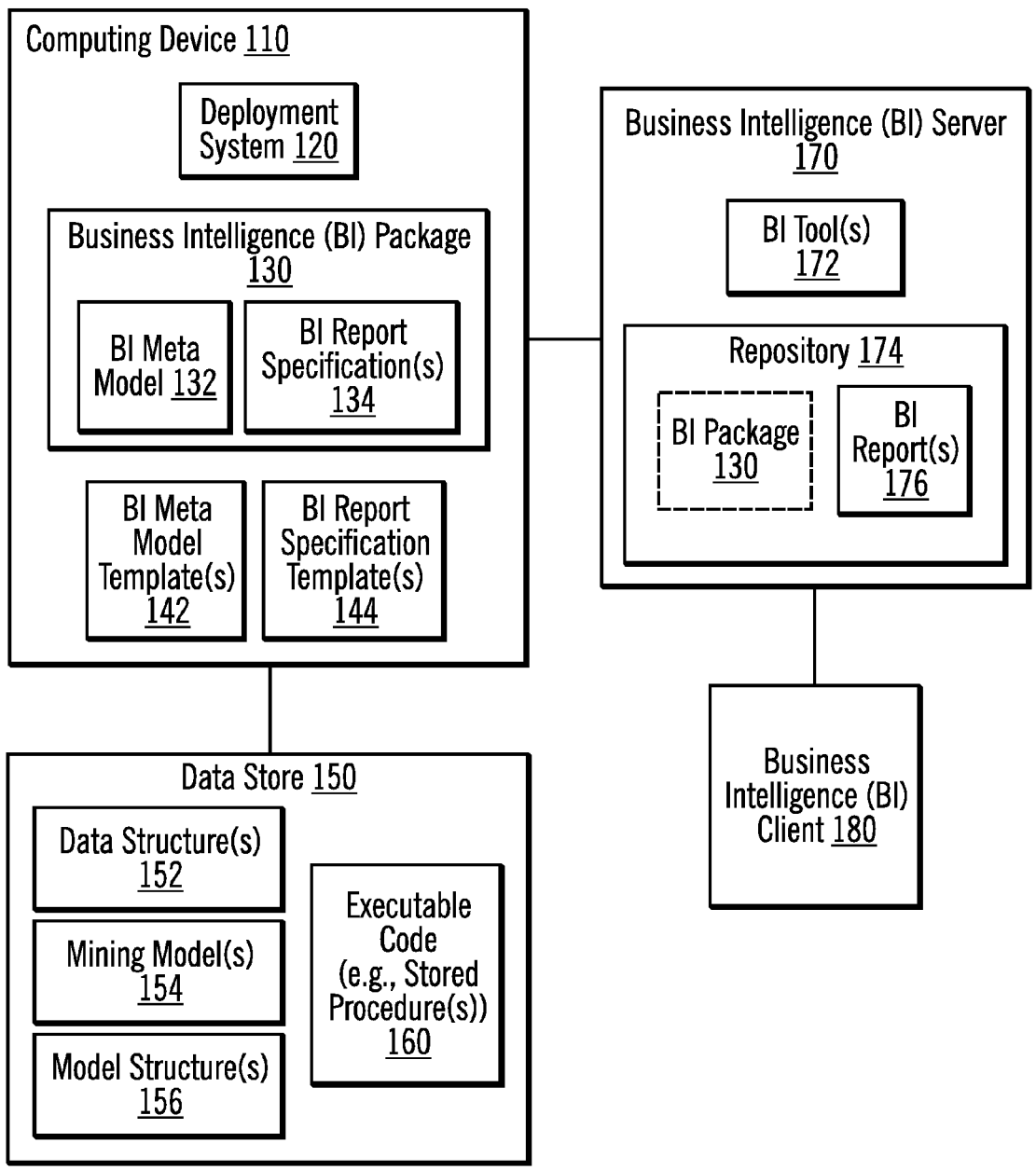
FIG. 1 illustrates a computing environment in accordance with certain embodiments.

FIG. 1 illustrates a computing environment in accordance with certain embodiments. A computing device 110 includes a deployment system 120, at least one BI package 130, one or more BI meta model templates 142 and one or more report specification templates 144. Each BI package 130 includes a BI meta model 132 (i.e. meta information) and one or more BI report specifications 134. In certain embodiments, each BI package 130 may include multiple BI meta models.

The computing device is coupled to a data store 150. The data store 150 includes one or more data structures 152, one or more mining models 154 (also referred to as "data mining models"), one or more model structures 156, and executable code 160 (e.g. one or more stored procedures). Although stored procedures may be used in examples herein, any form of executable code 160 may be used instead or in addition to the stored procedures. In certain embodiments, the data store 150 is a database. In certain embodiments, the data structures 152 are data tables. In certain embodiments, the model structures 156 are model tables. In certain embodiments, the mining models are in PMML format.

The computing device 110 is also coupled to a BI server 170, which is coupled to a BI client 180. The BI server 170 includes one or more BI tools 172 and a repository 174. The repository 174 stores a copy of each BI package 130 and stores one or more BI reports 176.

The deployment system 120 automatically generates reports based on the one or more data structures 152, one or more mining models 154, and one or more model structures 156 stored in the data store 150 and deploys them automatically to a BI tool 172 at the BI server 170. The deployment system 120 enables a single user without deep knowledge of data mining to generate the reports and accelerate the process of creating the reports.

The deployment system 120 enables automatic creation of BI reports 176 presenting data mining and/or predictive insights. Initially, the deployment system 120 automatically creates a table representation (e.g. one or more model structures 156) from the one or more mining models 154 and extracts the table representation to a database (e.g. the data store 150). In certain embodiments, the content of the mining model 154 is extracted into at least one model structure 156 having a schema dependent on the mining model. Next, the deployment system 120 generates a BI package 130 including a BI meta model 132 (i.e. meta information) and one or more BI report specifications 134 required by most BI tools 172. Finally, the deployment system 120 automatically deploys the BI package 130 to the BI tools 172.

FIG. 2 illustrates a partial example of an input data table 200 in accordance with certain embodiments. Table 200 is a partial example of a data structure 152. Table 200 contains already prepared input data for a clustering scenario (customer segmentation). The records represent bank customers with demographic, product related data, and transaction related data. In table 200, there are eight records, each with eleven columns of data.

FIG. 3 illustrates a partial example of a mining model 300, 310, 320 in PMML format in accordance with certain embodiments. FIG. 3 is formed by FIGS. 3A, 3B, and 3C. Data mining model 300 is an example of a mining model 154. The mining model 300 is in eXtensible Markup Language (XML) and represents a PMML data mining clustering model for the data table 200.

FIG. 4 illustrates a partial example of a model table 400 in accordance with certain embodiments. Model table 400 is an example of a model structure 156. The model table 400 contains parts of the previous mining model 300, 310, 320. In this example, the distribution statistics of the single clusters are represented. The model table 400 is accessed by the BI reports.

FIG. 5 illustrates an example of a BI meta model 500, 510, 520, 530 in accordance with certain embodiments. FIG. 5 is formed by FIGS. 5A, 5B, 5C, and 5D. The BI meta model 500, 510, 520, 530 is an example of a BI meta model 132. The BI meta model 500, 510, 520, 530 is in XML and represents a model specification that includes a description of model table 400.

FIG. 6 illustrates an example of a BI report specification 600, 610, 620, 630, 640, 650, 660, 670, 680, 690, and 695 in accordance with certain embodiments. FIG. 6 is formed by FIGS. 6A, 6B, 6C, 6D, 6E, 6F, 6G, 6H, 6I, 6J, and 6K. The BI report specification 600, 610, 620, 630, 640, 650, 660, 670, 680, 690, and 695 represents a BI report specification 134. The BI report specification 600, 610, 620, 630, 640, 650, 660, 670, 680, 690, and 695 is in XML and renders the data of the model table in a semantically useful way.

FIG. 7 illustrates a partial example of a stored procedure 700, 710 in accordance with certain embodiments. The stored procedure 700, 710 is an example of executable code 160. The stored procedure 700, 710 encapsulates processing to perform a clustering. In the stored procedure 700, 710, there is one parameter allowing passing of a maximum number of clusters value.

Figure 8:
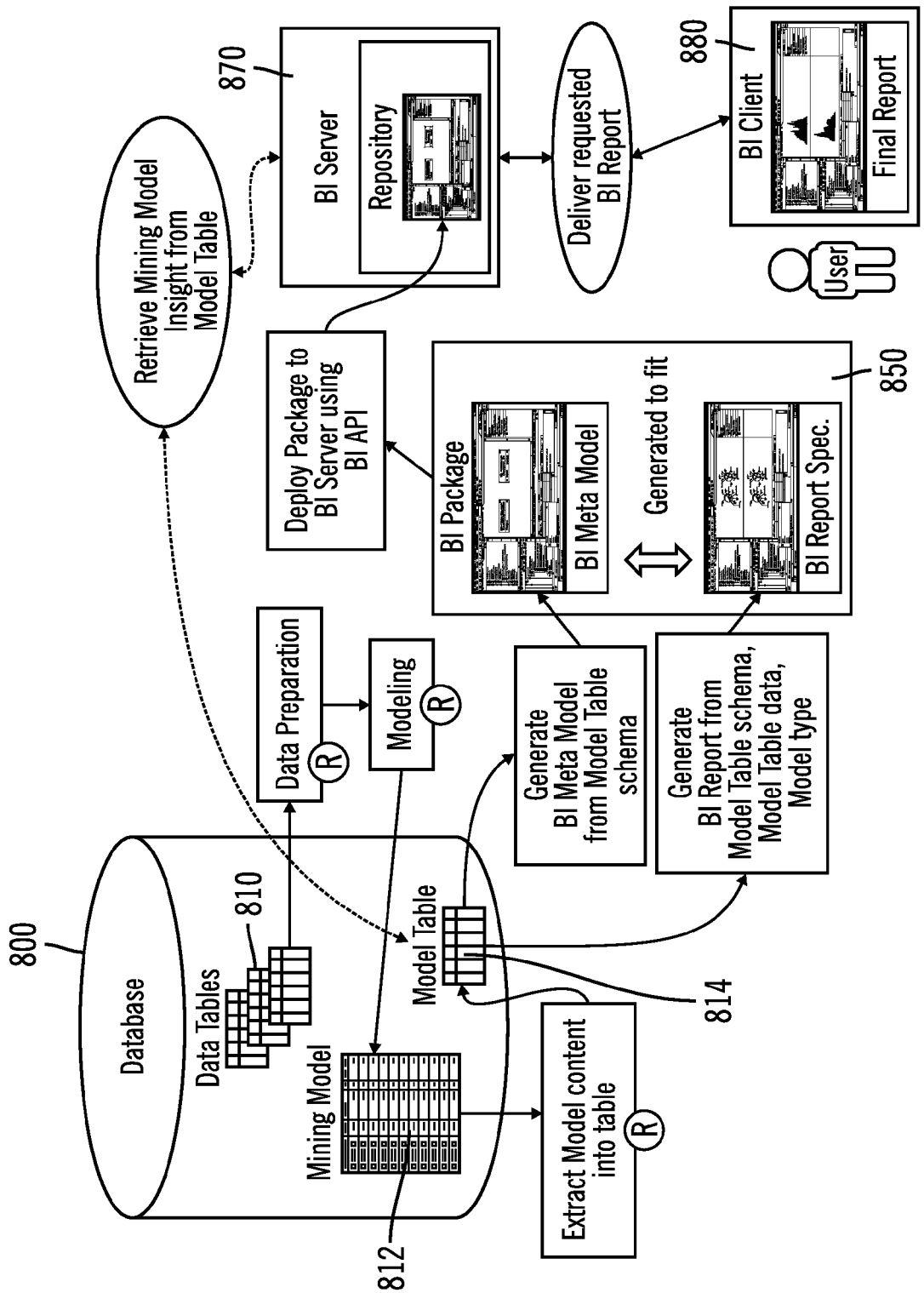
FIG. 8 illustrates automatic deployment in accordance with certain embodiments.

FIG. 8 illustrates automatic deployment in accordance with certain embodiments. The deployment system 120 automatically creates BI reports presenting data mining and/or predictive insight. The data mining and/or predictive insight is created by a data mining user implementing a mining flow that includes data preparation and the actual modeling (i.e. which executes the mining technique to create the mining model 812 from the data tables 810 and store the mining model 812 in the database 800).

The deployment system 120 automatically creates a table representation from the mining model 812 and extracts that table representation to the database 800 as a model table 814. This table representation is done in a fashion such that the data mining insight can be accessed and understood by a BI tool.

The deployment system 120 generates a BI package 850 that includes (1) meta information (a BI meta model) and (2) a BI report specification required by the BI tool. The meta information and the report specification are dynamically created based on the content of the mining model 812 and the schema and data of the model table 814 containing the mining insight.

These reports are often static, based on the information contained in the mining model 812. As the insight is contained in the model table 814, the insight can be updated by re-executing the processing marked with an "R" in FIG.

8. This creates new insight (e.g. if the underlying data in the data tables 810 changes). This processing can also be incorporated easily into automatic business processes.

Finally, the deployment system 120 automatically deploys the BI package 850 to the BI server 870. The deployment system 120 uses the BI tool's Application Programming Interfaces (API) to deploy the generated BI meta model and BI report specification without manual user interaction. The deployment system 120 also triggers creation of the actual report from the report specification within the BI server 870. Then, the user can access the mining and/or predictive insight like any other report using the BI client 880. The BI server 870 retrieves the mining insight directly from the model table 814. Further automation may include automatic distribution of the reports using other channels (e.g. email).

With reference to FIG. 1, in certain embodiments, the BI meta model 132 generation is based on the BI meta model templates 142. On the other hand, a conventional meta model designer may start from scratch. The BI meta model templates 142 contain basic structures for the BI meta model 132. First, the deployment system 120 analyzes the structure of the model structure 156. From this analysis, the deployment system 120 derives BI meta model objects (e.g. query subjects (abstract views of tables), relationships (determining how several query subjects relate to each other), determinants (defining different levels of granularity on a query subject), etc.). Second, the deployment system 120 analyses the actual data to derive meta model object types (e.g. measures vs. dimensions or a time hierarchy is created in case columns of type date are involved). In certain embodiments, the BI meta model template 142 is selected based on the meta model object types. In certain embodiments, the BI meta model template 142 may be selected based on the mining technique and use case scenario. FIG. 9 illustrates an example BI meta model template 900, 910, 920, 930, 940, 950, 960, 970, and 980 in accordance with certain embodiments. FIG. 9 is formed by FIGS. 9A, 9B, 9C, 9D, 9E, 9F, 9G, 9H, and 9I. The BI meta model template 900, 910, 920, 930, 940, 950, 960, 970, and 980 is an example of a BI meta model template 142.

A model includes an abstract representation of the data source structures (e.g. tables in a relational database), relationships between those representations, information on how to aggregate the data, a preferred language to be used, calculations, filters, folders, etc. Thus, a model may be described as an abstraction layer over the data source, which can be enhanced with more information. The elements of the model can then be used (i.e. referenced) in the report specification.

In certain embodiments, the BI report specification 134 generation is based on the BI report specification templates 144. On the other hand, a conventional report designer may start from scratch. The BI report specification templates 144 contain basic structures for the BI report specification 134 depending on the mining model type (i.e. data mining functions, such as, clustering, classification, association, regression, sequence rules, time series, etc.). The different data mining functions create different data mining models.

The association data mining functions may be described as finding items in data that are associated with each other in a meaningful way. With the classification data mining functions, a user can create, validate, or test classification models (e.g. analyze why a certain classification was made or predict a classification for new data). The clustering data mining function may be described as searching the input data for characteristics that frequently occur in common and groups the input data into clusters, where the members of each cluster have similar properties.

Regression is similar to classification except for the type of the predicted value. For example, classification predicts a class label, while regression predicts a numeric value. Moreover, regression also can determine the input fields that are most relevant to predict the target field values. The predicted value might not be identical to any value contained in the data that is used to build the model. An example application is customer ranking by expected profit.

The sequence rules data mining function may be described as finding typical sequences of events in data. The time series data mining function may be described as enabling forecasting of time series values.

In certain embodiments, based on the mining model type, one or more report specification templates are available. The user may choose between the available ones. During BI report specification 134 generation, the deployment system 120 analyzes the content of the model structure 156. For example, the data of the model structure 156 is analyzed for the number of features that define a clustering. The deployment system 120 detects for each cluster the most relevant features that describe each cluster. Only those most relevant features are incorporated into the BI report specification 134. Then, the deployment system 120 replicates the BI report specification template 144 with the most relevant features in their relevant order.

FIG. 10 illustrates an example BI report specification template 1000, 1010, 1020, 1030, 1040, 1050, 1060, 1070, and 1080 in accordance with certain embodiments. FIG. 10 is formed by FIGS. 10A, 10B, 10C, 10D, 10E, 10F, 10G, 10H, and 10I. The BI report specification template 1000, 1010, 1020, 1030, 1040, 1050, 1060, 1070, and 1080 is an example of a BI report specification template 144.

In certain embodiments, the deployment system 120 analyzes the model structure 156 for the relevant information and incorporates this content in an optimal way using the BI report specification templates 144.

Furthermore, the formatting of the reports and charts is optimized based on the data of the model structure 156. For example, different charts may result in different axis scaling as the data within those charts may vary. The charts in BI tools 172 will then be optimized for the underlying data. Due to the analysis of the deployment system 120, the optimal axis scaling can be determined in advance, which allows for better comparison and understanding of the mining model.

For each mining model type, there may exist several BI report specifications that are linked with each other. For example, detail reports for dedicated charts or drill through reports may be linked.

In case the mining model 154 is re-created, the deployment system 120 performs analysis of the mining model table that may result in a different formatting and layout of the reports and charts. Then, the previous BI report specification 134 may not have the optimal layout for the new mining model 154. Therefore, the deployment system 120 automatically re-generates the BI report specification 134 to ensure optimal layouts of the reports and charts.

Often users need to know details from the underlying data from which the mining model 154 was generated. Thus, the deployment system 120 automatically incorporates drill through data into the reports, allowing for better understanding of the mining model.

Most useful are those data items that represent typical examples. For example, clustering methods that create homogenous groups with similar characteristics. Typical examples are those data items which best represent the characteristic of a certain cluster. The deployment system 120 automatically detects those typical data items and incorporates them into the report.

The deployment system 120 reduces manual human effort from hours or days to seconds. Further, deployment system 120 allows performing this task by a single person without any expert knowledge of any of the multiple tools involved or the mining model 154. Especially in cases where data or the complete structure of the mining model 154 is changing often, and thus, manual changes are required, large cost and time savings are reached.

Figure 11:
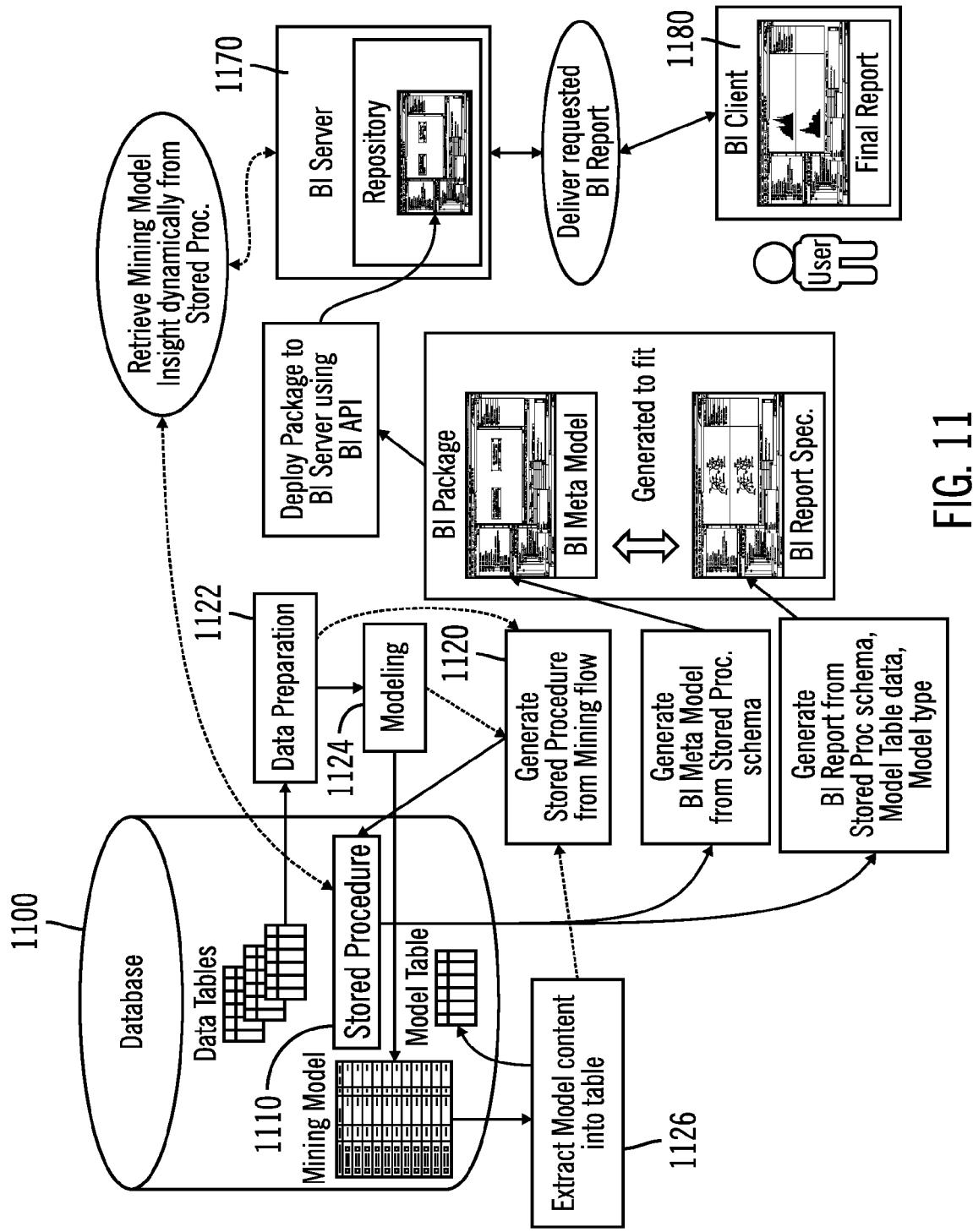
FIG. 11 illustrates an automatic deployment procedure with dynamic invocation from a user in accordance with certain embodiments.

FIG. 11 illustrates an automatic deployment procedure with dynamic invocation from a user in accordance with certain embodiments. The deployment system 120 allows creation and deployment of dynamic reports which invoke mining of data at the time a user (e.g. a report consumer at the BI client 180) interacts with the BI tool. This allows the user to customize the reports by passing data mining parameters and/or other settings.

In FIG. 11, a stored procedure is stored in the database 1100. In certain embodiments, a mining expert defines processing of the stored procedure and what parameter fields are dynamic, and the deployment system 120 automatically creates the stored procedure 1110 from the mining flow, which was created by the data preparation and modeling. In particular, the deployment system 120 creates the stored procedure in block 1120 (generate stored procedure from mining flow) using data from block 1122 (data preparation), block 1124 (modeling), and block 1126 (extract model content into table).

The stored procedure 1110 can then be invoked by the BI server 1170 passing the data mining parameters entered by the user using the BI client 1180. The dynamically created mining insight is then retrieved by the BI server 1170 from the result set returned by the stored procedure 1110.

In certain embodiments, the stored procedure 1110 generation is based on the data preparation and mining flows defined by a mining expert. The deployment system 120 converts the flow into Structured Query Language (SQL) statements and further incorporates data mining parameters defined by the user. Those data mining parameters are defined as input for the stored procedure 1110 and are incorporated at the proper positions within the SQL body. The user invokes the report, then the BI server 1170 invokes the stored procedure 1170 and passes the data mining parameters. The complex flow is transparent for the user. The stored procedure 1110 returns data in the same format as the model table.

FIGS. 12-22 illustrate user interaction in accordance with certain embodiments. In certain embodiments, selected elements may be highlighted in the screens shown in FIGS. 12-22. In FIGS. 12-22, for ease of reference, selected items may be shown with dotted or bold lines.

Figure 12:
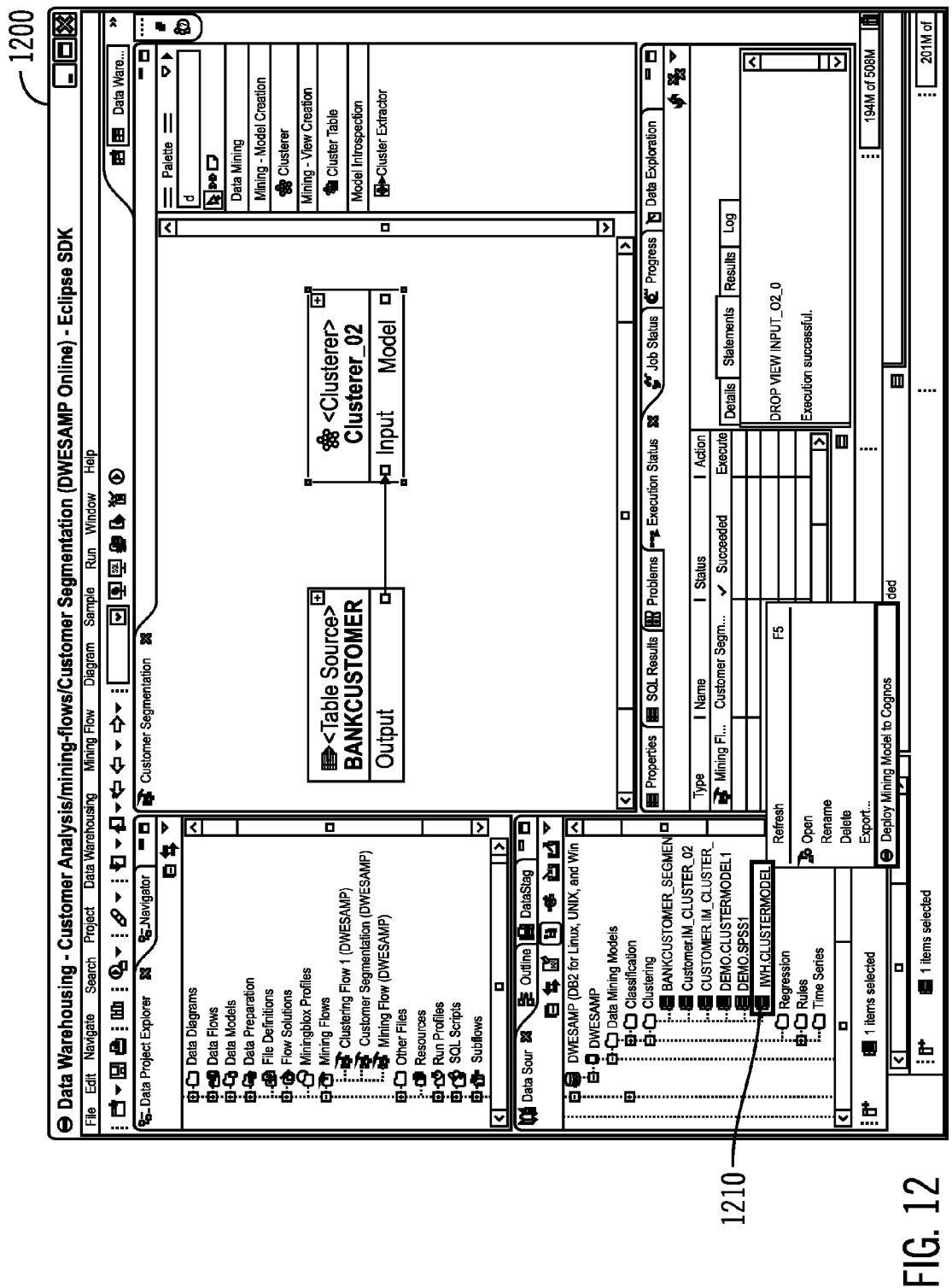
FIG. 12 illustrates data mining models in a screen in accordance with certain embodiments.

FIG. 12 illustrates data mining models in a screen 1200 in accordance with certain embodiments. A user selects the data mining model 1210 to be deployed in the data mining tool.

Figure 13:
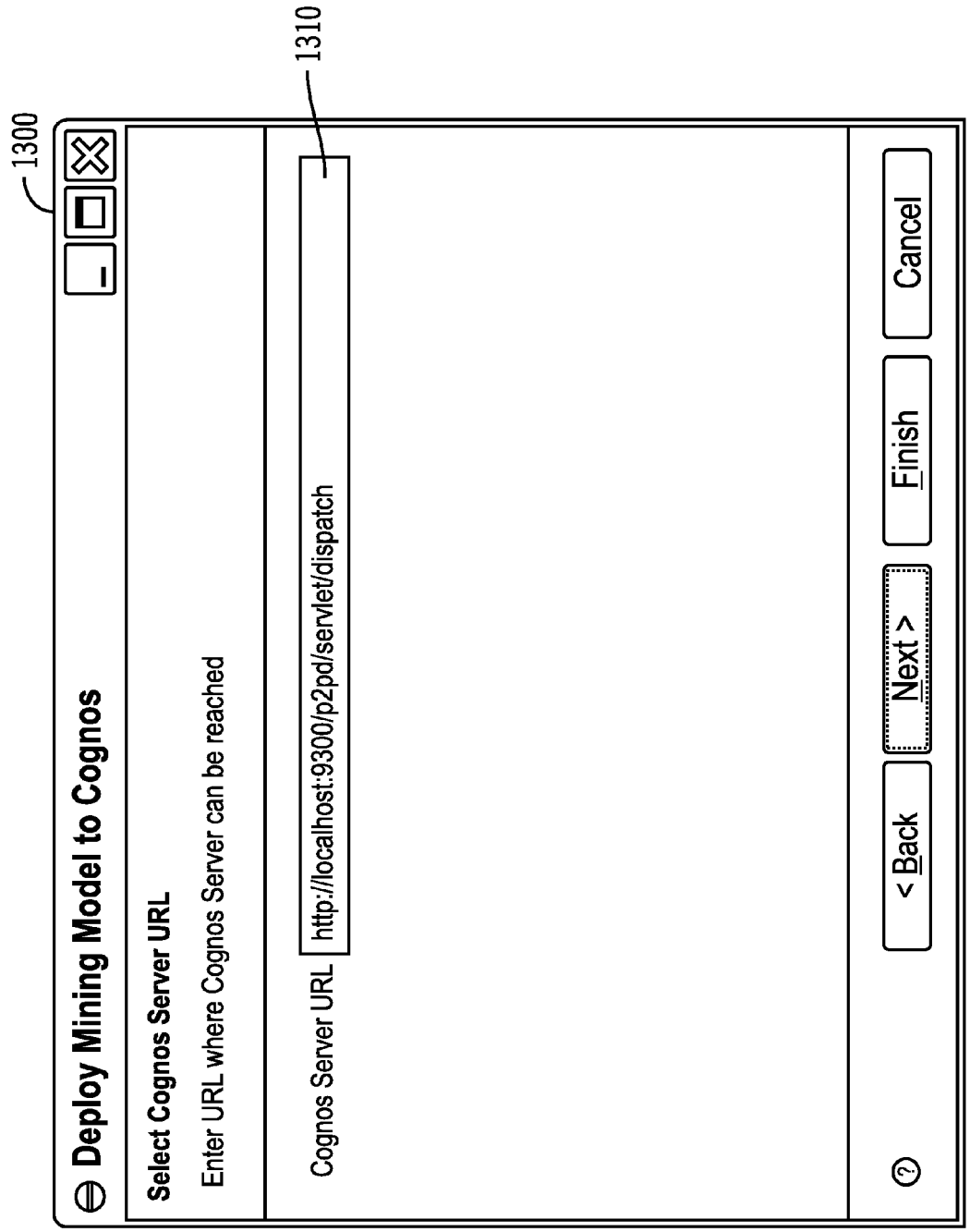
FIG. 13 illustrates specification of a BI tool in a screen in accordance with certain embodiments.
Figure 14:
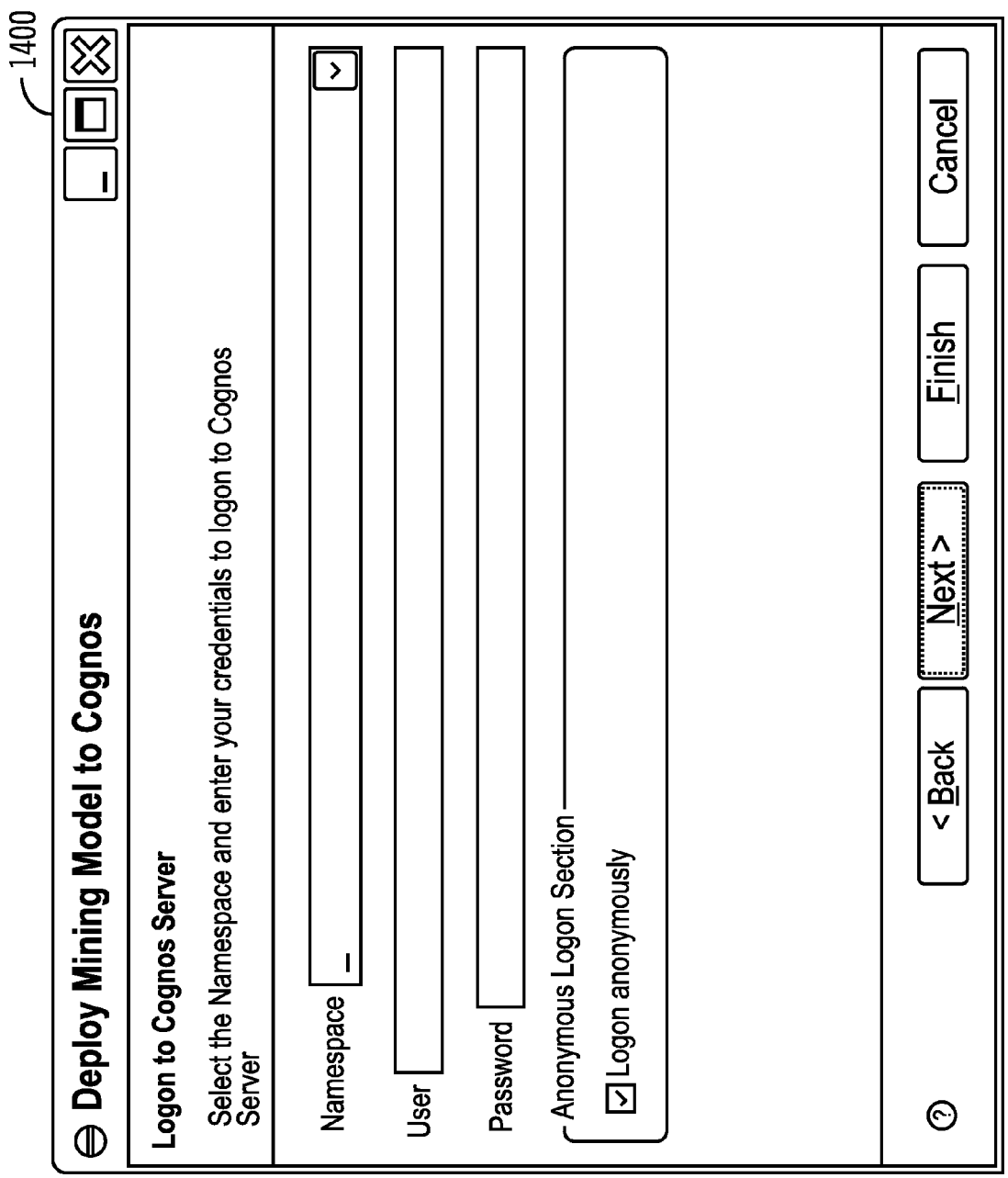
FIG. 14 illustrates logon credentials in a screen in accordance with certain embodiments.

FIG. 13 illustrates specification of a BI tool in a screen 1300 in accordance with certain embodiments. The user specifies the BI tool 1310 to which the user wants to deploy the data mining model. FIG. 14 illustrates logon credentials in a screen 1400 in accordance with certain embodiments. In the screen 1400, the user provides necessary logon credentials.

Figure 15:
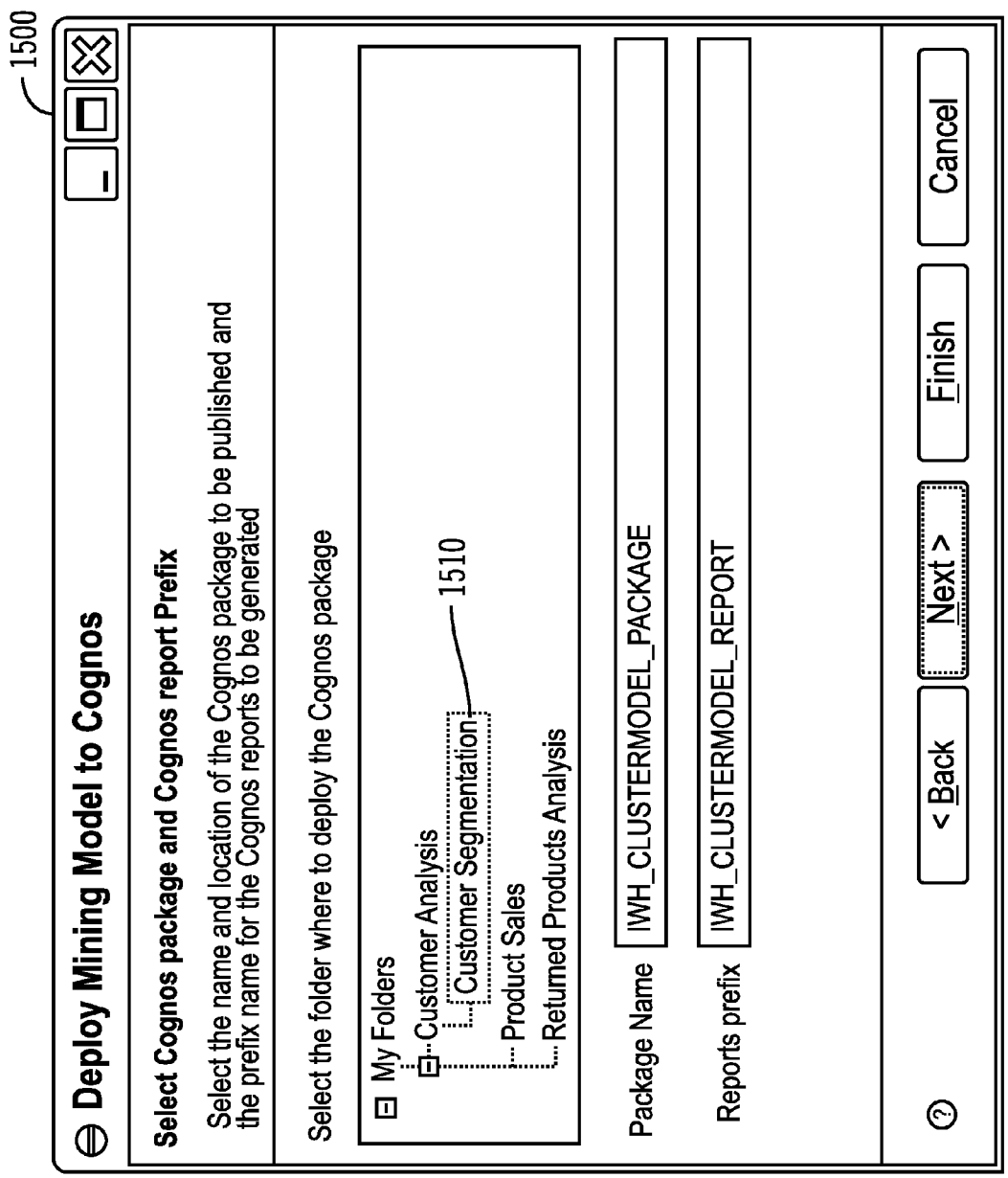
FIG. 15 illustrates selection of a destination within the BI tool in screen in accordance with certain embodiments.

FIG. 15 illustrates selection of a destination within the BI tool in screen 1500 in accordance with certain embodiments. The user selects the destination 1510 within the BI tool to which deploy the BI package and reports. Optionally, names of the generated meta information and reports can be adapted.

Figure 16:
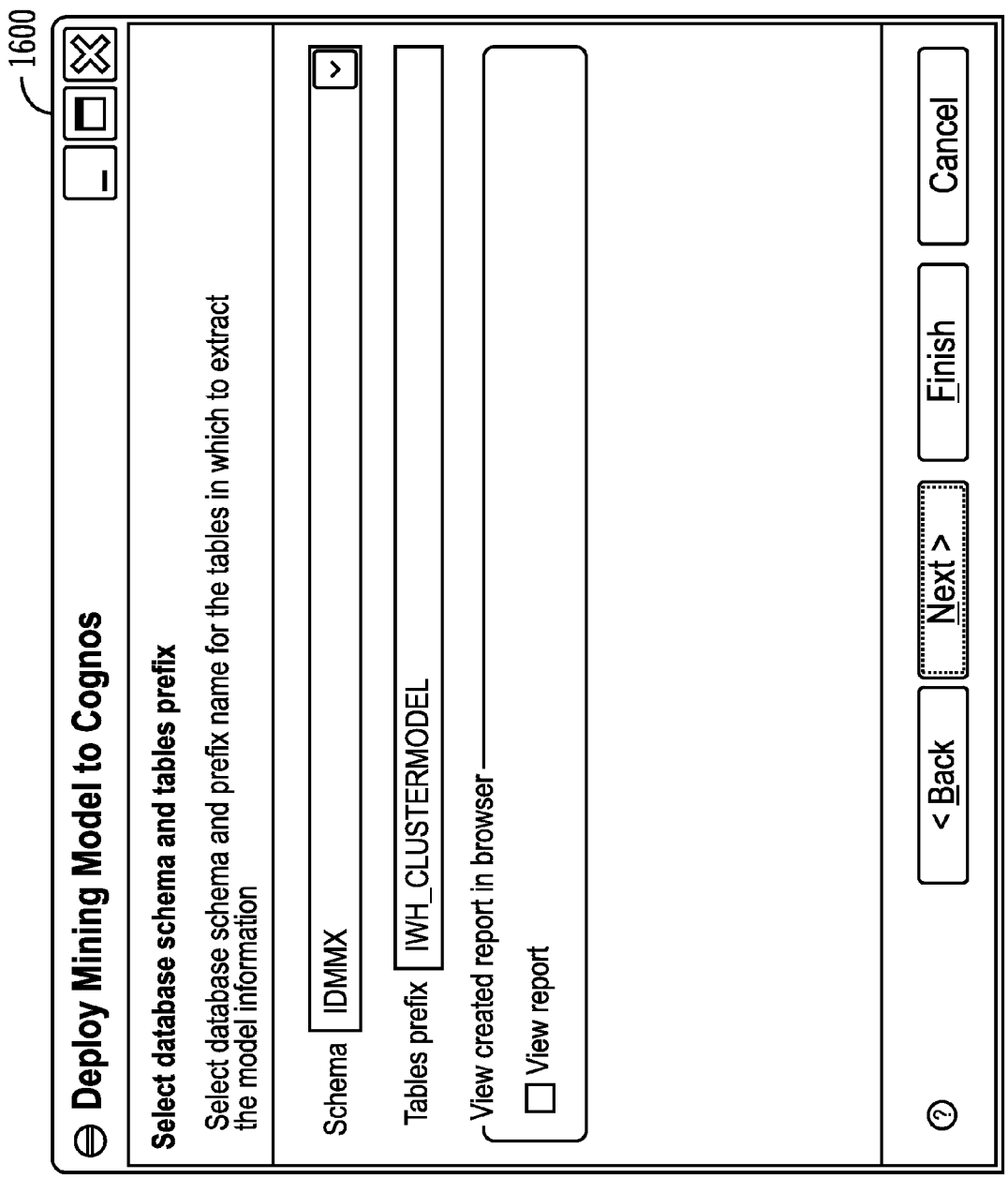
FIG. 16 illustrates schema table information in a screen in accordance with certain embodiments.

FIG. 16 illustrates schema table information in a screen 1600 in accordance with certain embodiments. In screen 1600, optionally, the user may adapt the name of the model structures 156 to which the data mining insight is extracted.

Figure 17:
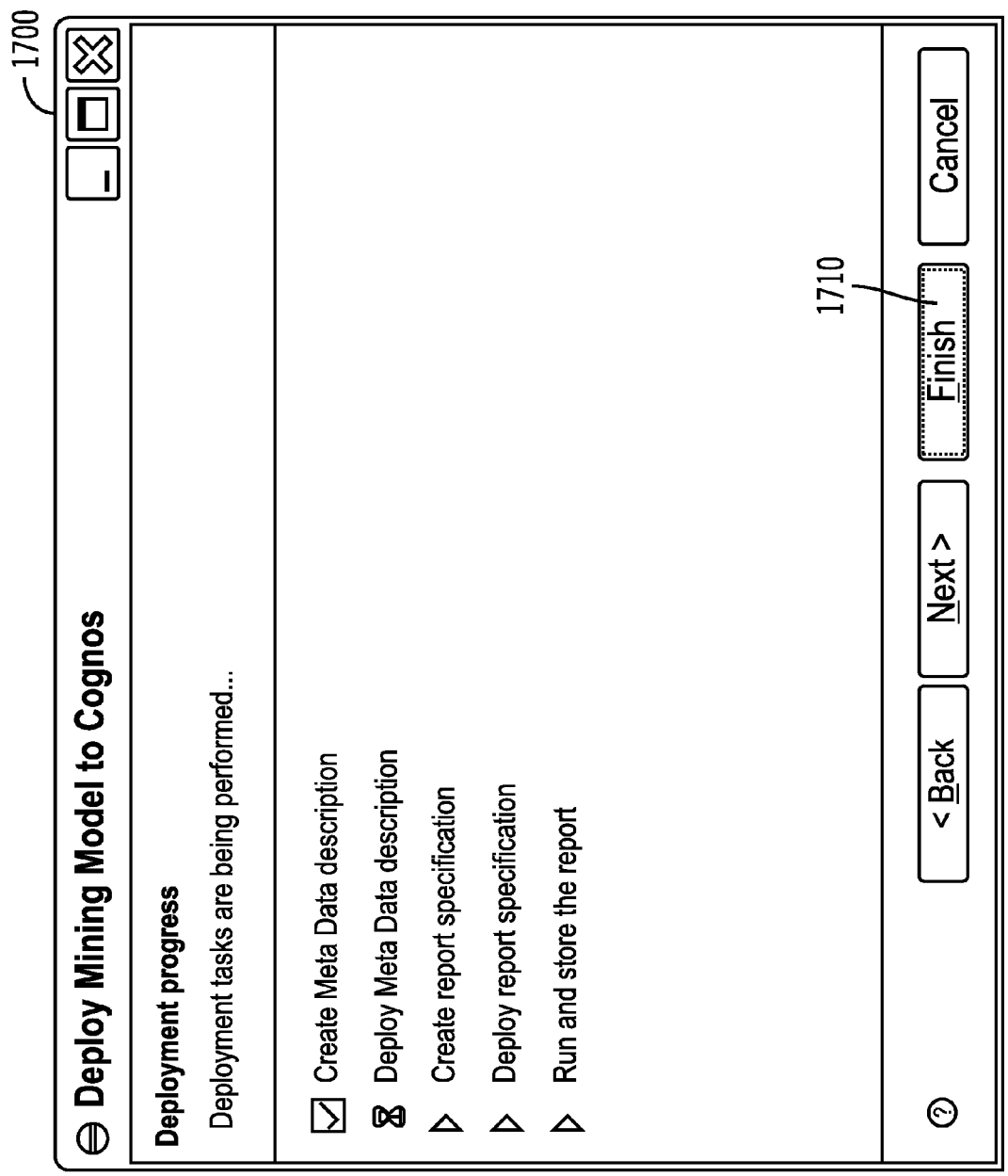
FIGS. 17 and 18 illustrate progression in screens in accordance with certain embodiments.
Figure 18:
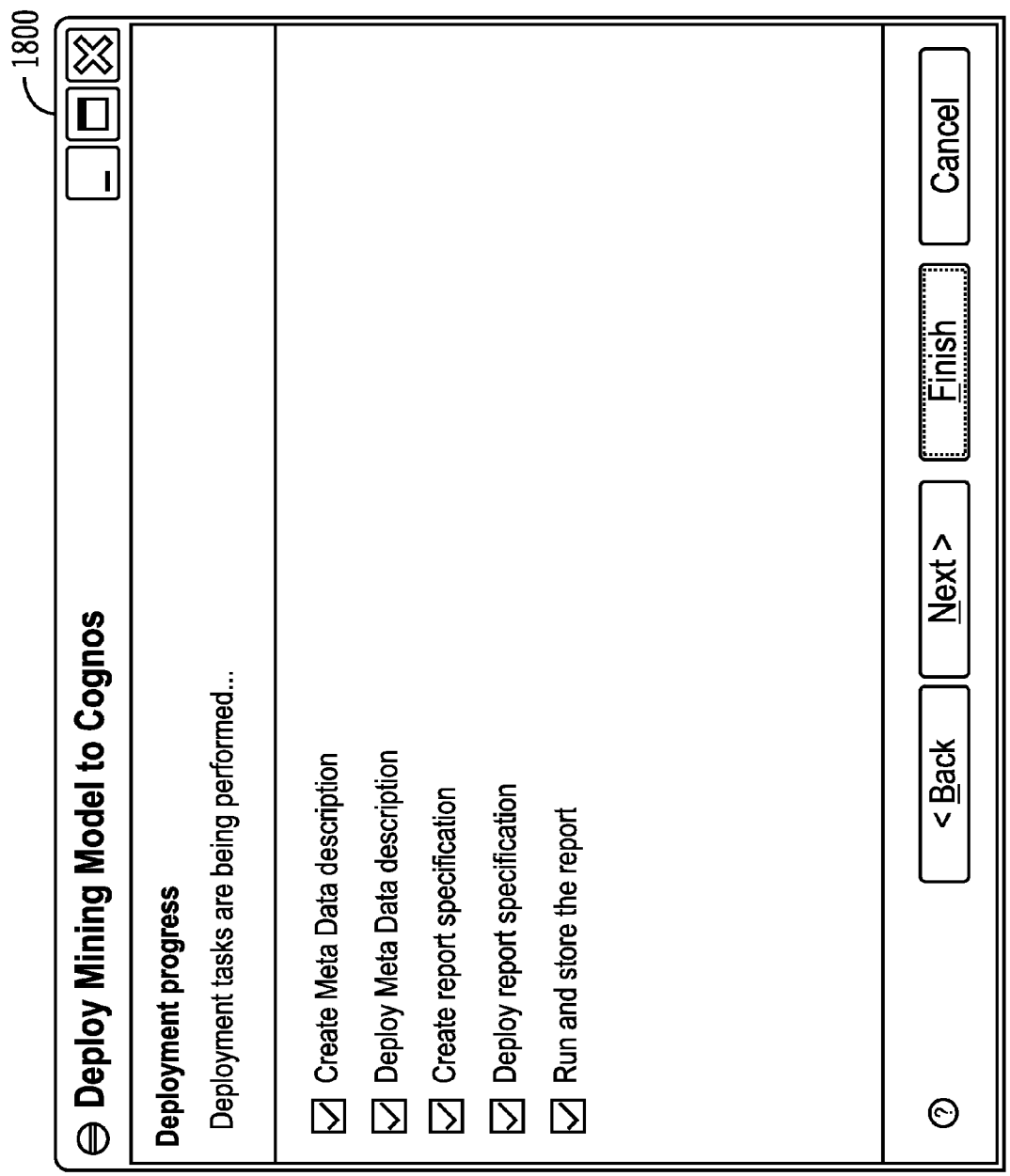

FIGS. 17 and 18 illustrate progression in screens 1700, 1800 in accordance with certain embodiments. A user selects the Finish button 1710, and then the deployment system 120 automatically generates a BI package 130 for the selected data mining model. This is a data-driven process.

Figure 19:
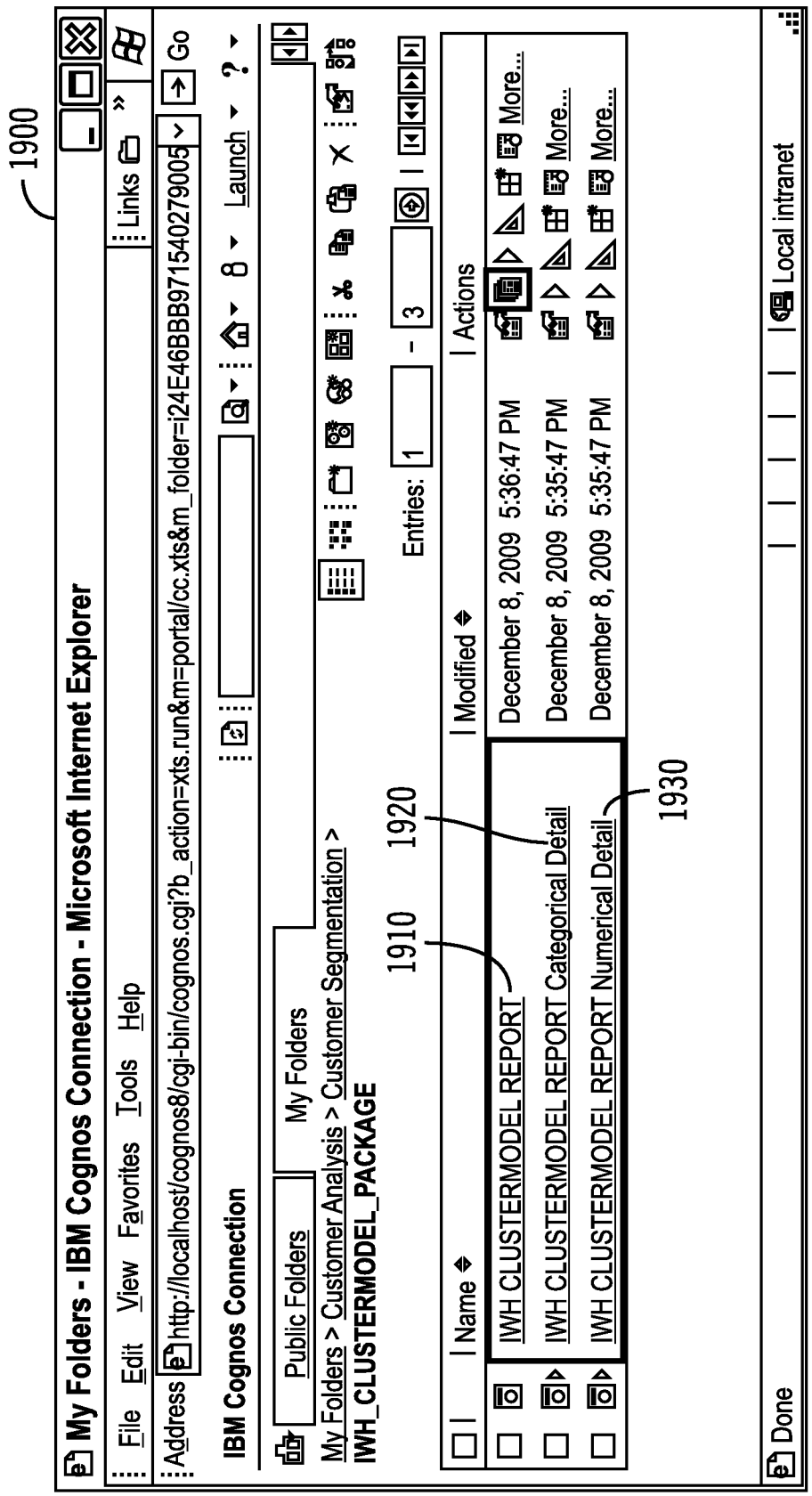
FIG. 19 illustrates a list of reports in screen with the mining insight that are available in the BI tool in accordance with certain embodiments.

FIG. 19 illustrates a list of reports in screen 1900 with the mining insight that are available in the BI tool in accordance with certain embodiments. Clicking on the reports 1910, 1920, 1930 allows the user to browse the mining information.

Figure 20:
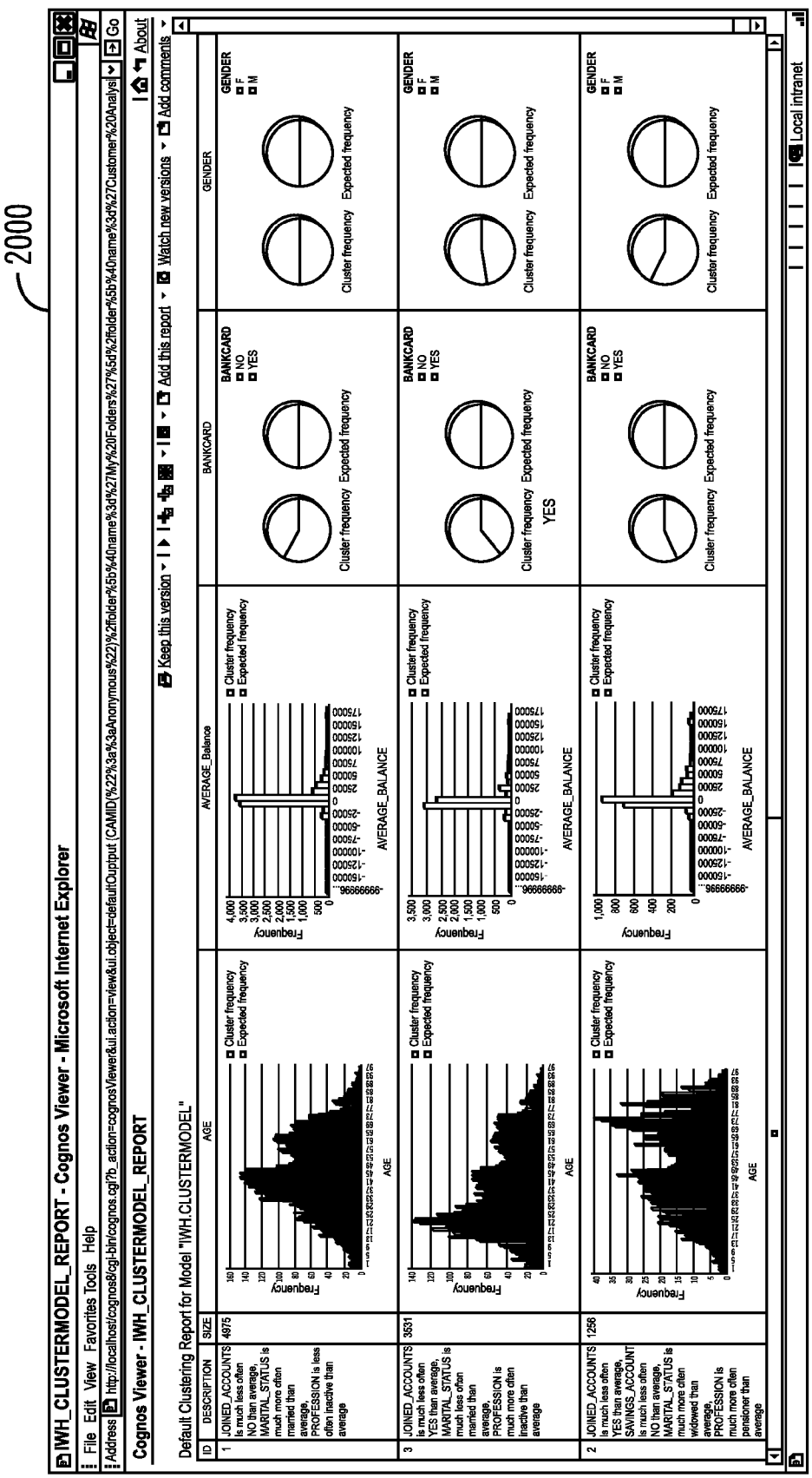
FIGS. 20, 21, and 22 illustrate various reports in screens with the mining insight that are available in the BI tool in accordance with certain embodiments.
Figure 21:
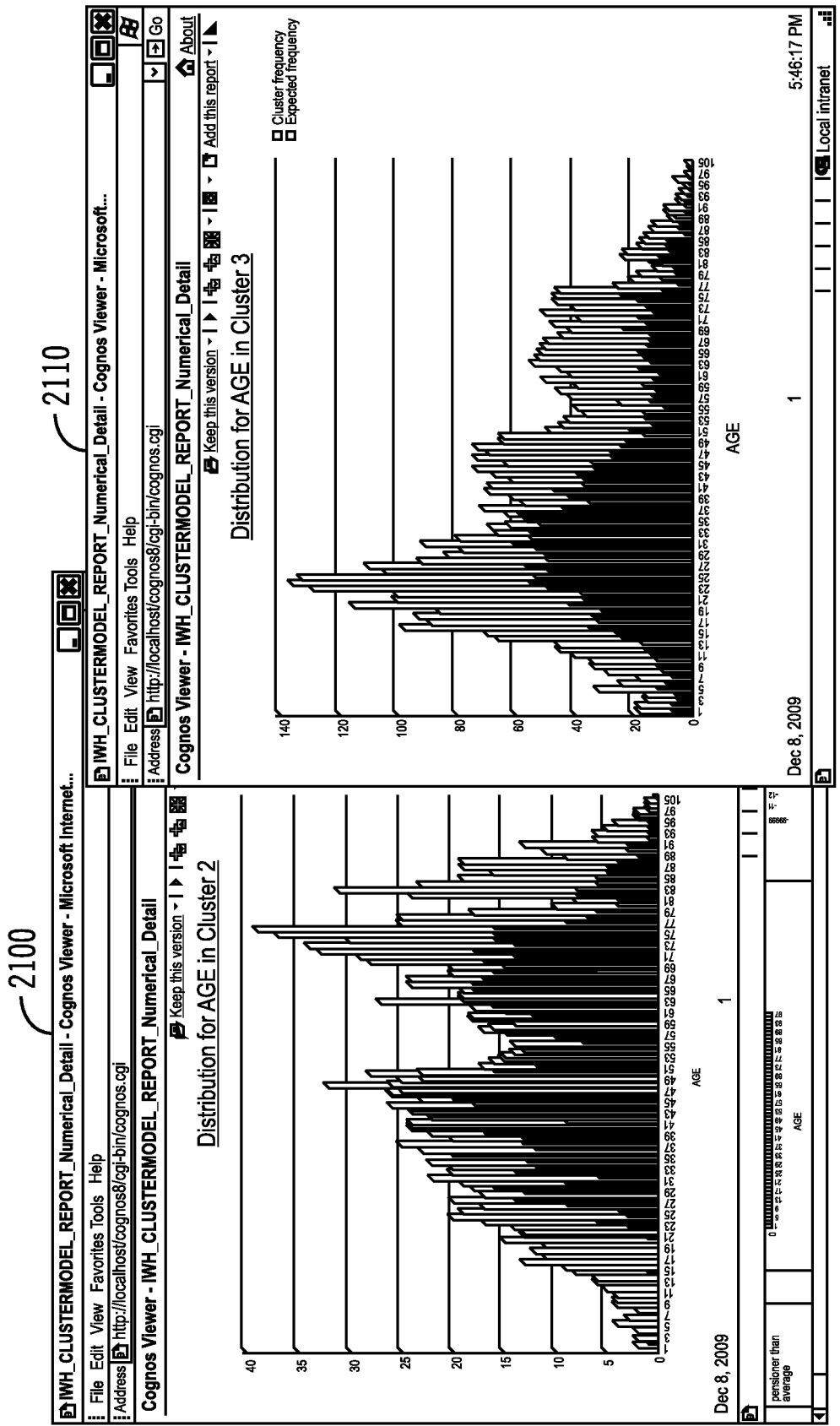
Figure 22:
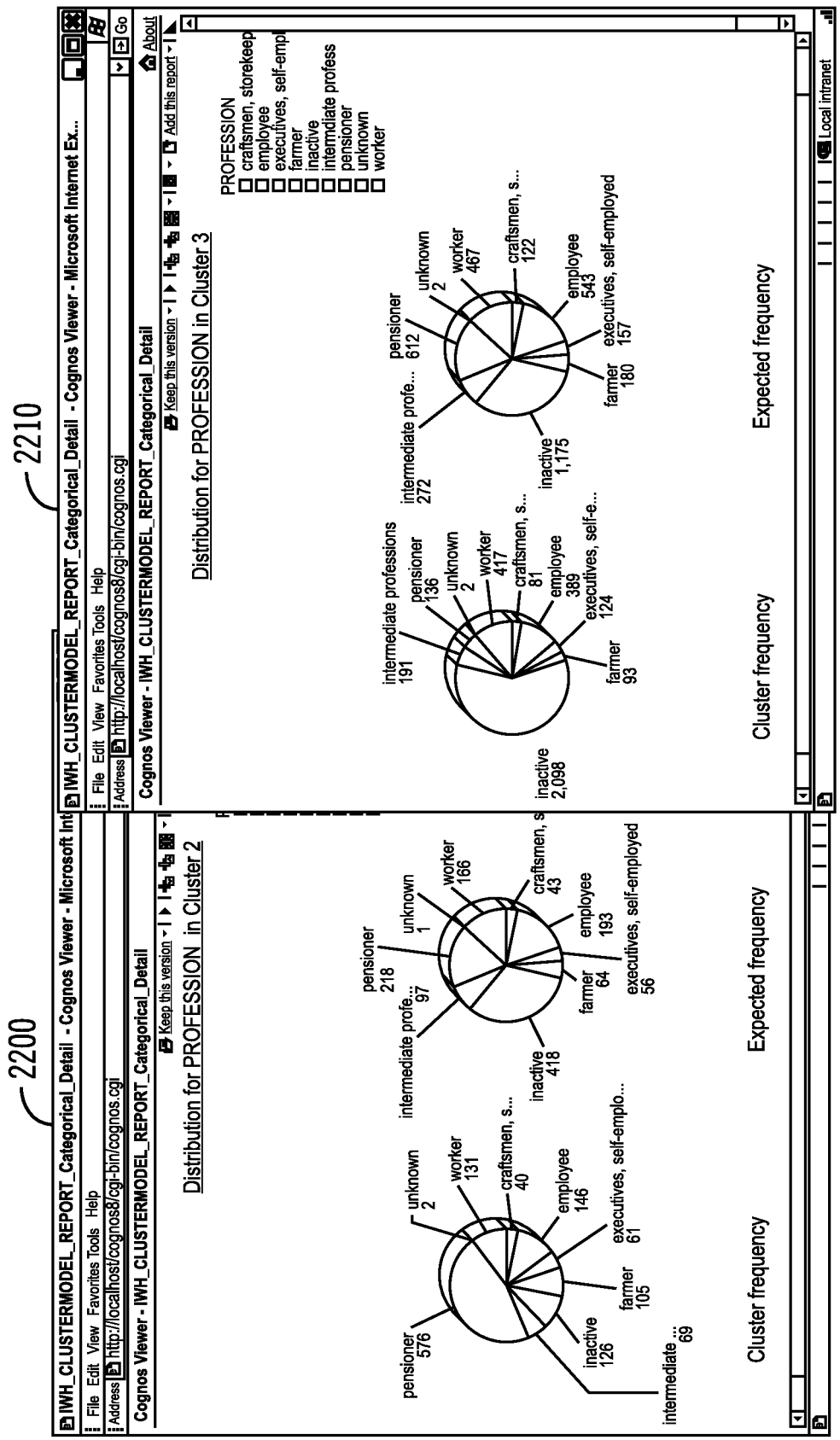

FIGS. 20, 21, and 22 illustrate various reports in screens 2000, 2100, 2110, 2200, 2210 with the mining insight that are available in the BI tool in accordance with certain embodiments.

Figure 23:
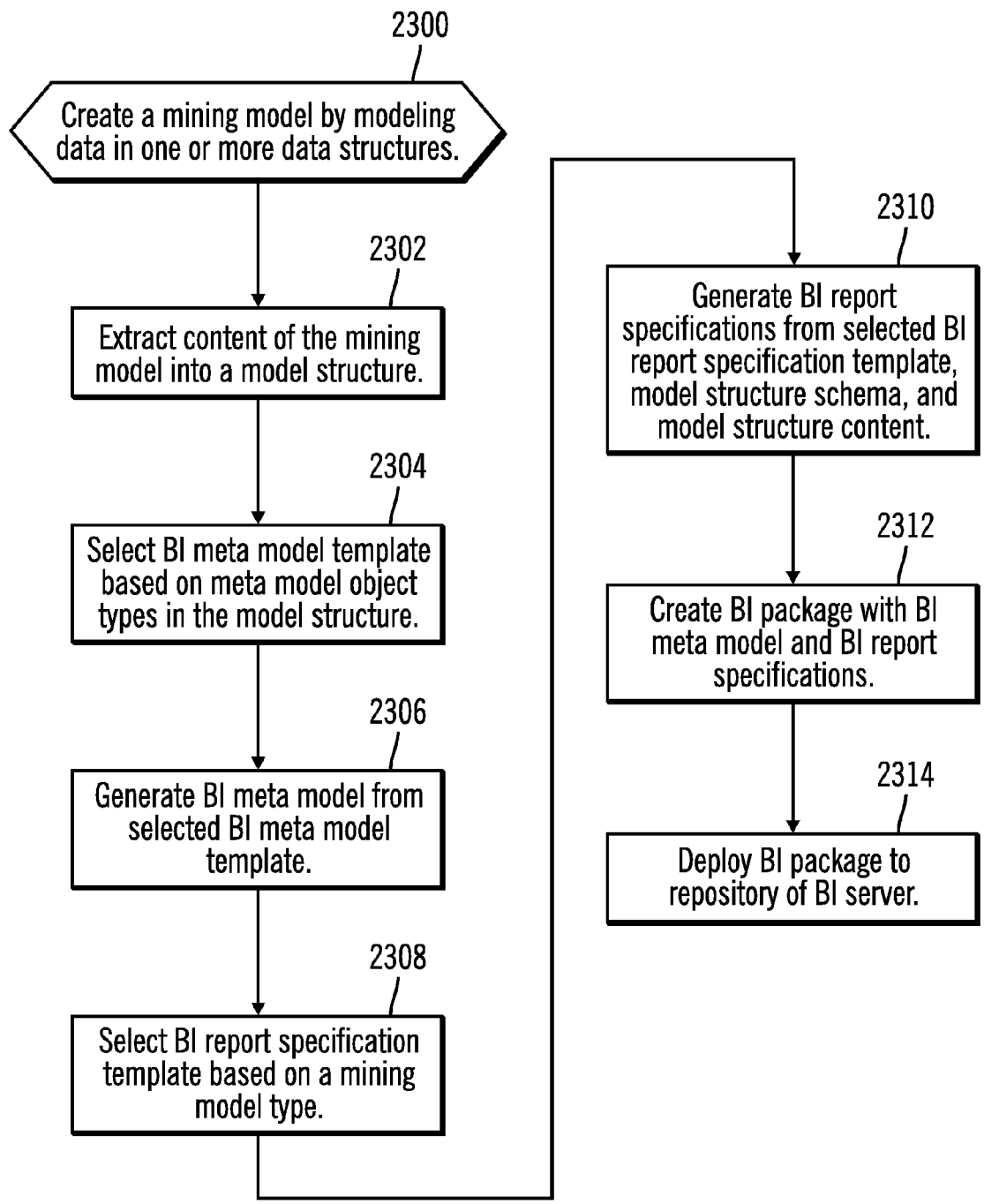
FIG. 23 illustrates, in a flow diagram, logic performed by the deployment system 120 in accordance with certain embodiments.

FIG. 23 illustrates, in a flow diagram, logic performed by the deployment system 120 in accordance with certain embodiments. Control begins at block 2300 with the deployment system 120 creating a mining model 154 by modeling data in one or more data structures 152. In block 2302, the deployment system 120 extracts the content of the mining model 154 into a model structure 156. In block 2304, the deployment system 120 selects a BI meta model template 142 based on one or more meta model object types (e.g. measures vs. dimensions or a time hierarchy is created in case columns of type date are involved) in the model structure 156. In block 2306, the deployment system 120 generates a BI meta model 132 from the selected BI meta model template 142. In block 2308, the deployment system 120 selects a BI report specification template 144 based on a mining model type (e.g. clustering, classification, association, etc.). In block 2310, the deployment system 120 generates the BI report specification 134 from the selected BI report specification 144, the model structure 156 schema, and the model structure 156 content. In block 2312, the deployment system 120 creates a BI package 130 with BI meta model 132 and the BI report specification 134. In block 2314, the deployment system 120 deploys the BI package 130 to the repository 174 of the BI server 170.

Figure 24:
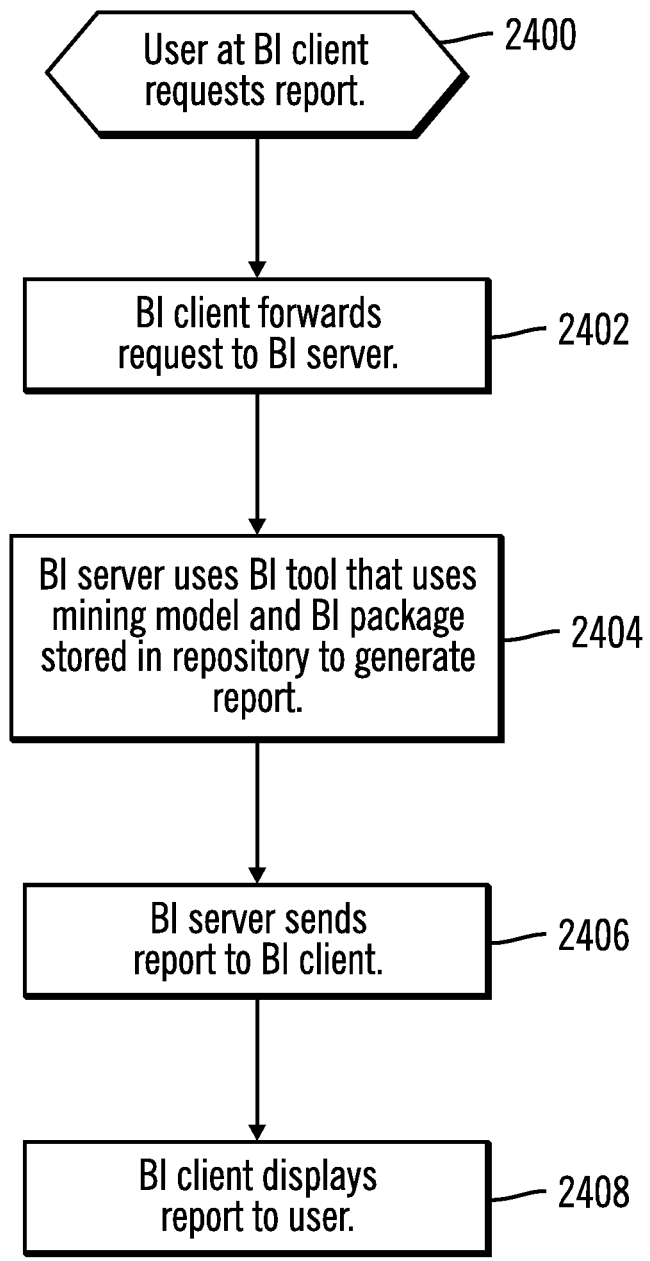
FIG. 24 illustrates, in a flow diagram, logic performed by the BI client and the BI server in accordance with certain embodiments.

FIG. 24 illustrates, in a flow diagram, logic performed by the BI client 180 and the BI server 170 in accordance with certain embodiments. Control begins at block 2400 with a user at the BI client 180 requesting a report. In block 2402, the BI client 180 forwards the request to the BI server 170. In block 2404, the BI server 170 uses a BI tool 174 that uses the mining model 154 (which the BI server 170 retrieves from the computing device 110) and the BI package stored in the repository 174 to generate the BI report 176. In block 2406, the BI server 170 sends the BI report 176 to the BI client 180. In block 2408, the BI client 180 displays the BI report 176 to the user.

Figure 25:
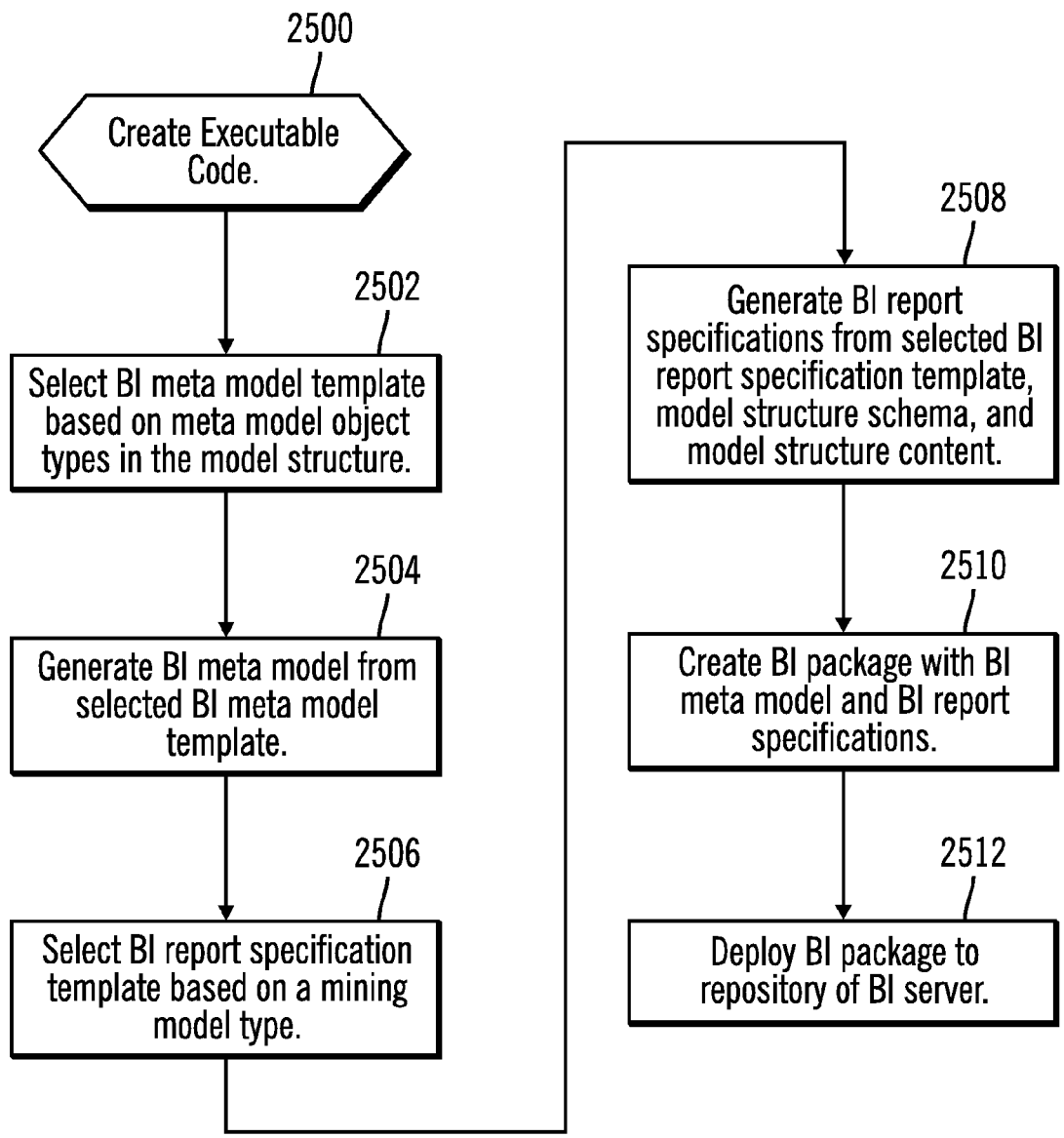
FIG. 25 illustrates, in a flow diagram, logic performed by the deployment system using a stored procedure in accordance with certain embodiments.

FIG. 25 illustrates, in a flow diagram, logic performed by the deployment system 120 using a stored procedure in accordance with certain embodiments. Control begins at block 2500 with the deployment system 120 creating executable code 160 (e.g. a stored procedure). The executable code, when invoked or executed with data mining parameters and/or settings provided by a user, creates the mining model 154 by modeling data in one or more data structures 152 and extracts the content of the mining model 154 into a model structure 156. In block 2502, the deployment system 120 selects a BI meta model template 142 based on one or more meta model object types (e.g. measures vs. dimensions or a time hierarchy is created in case columns of type date are involved) in the model structure 156. In block 2504, the deployment system 120 generates a BI meta model 132 from the selected BI meta model template 142. In block 2506, the deployment system 120 selects a BI report specification template 144 based on a mining model type (e.g. clustering, classification, association, etc.) In block 2508, the deployment system 120 generates the BI report specification 134 from the selected BI report specification 144, the model structure 156 schema, and the model structure 156 content. In block 2510, the deployment system 120 creates a BI package 130 with BI meta model 132 and the BI report specification 134. In block 2512, the deployment system 120 deploys the BI package 130 to the repository 174 of the BI server 170.

Figure 26:
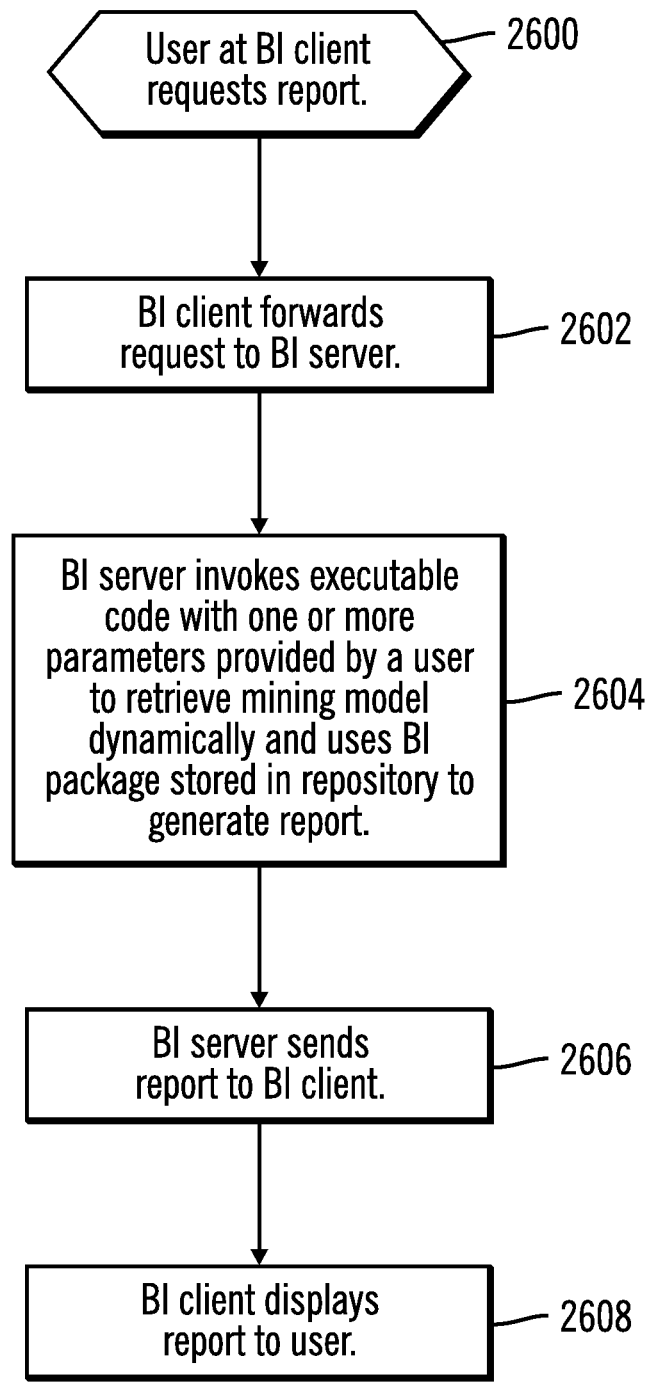
FIG. 26 illustrates, in a flow diagram, logic performed by the BI client and the BI server using a stored procedure in accordance with certain embodiments.

FIG. 26 illustrates, in a flow diagram, logic performed by the BI client 180 and the BI server 170 using a stored procedure in accordance with certain embodiments.

Control begins at block 2600 with a user at the BI client 180 requesting a report. In block 2602, the BI client 180 forwards the request to the BI server 170. In block 2604, the BI server 170 invokes (executes) the executable code 160 with one or more parameters provided by a user to retrieve the mining model 154 dynamically and uses the BI package 130 stored in the repository 174 to generate the BI report 176. In block 2606, the BI server 170 sends the BI report 176 to the BI client 180. In block 2608, the BI client 180 displays the BI report 176 to the user.

Thus, the deployment system 120 allows for automatic, fast and data-driven deployment of data mining results to BI tools 172. The deployment system 120 abstracts the user in a fast and intuitive fashion from the complexity of the underlying various processes. Therefore, a single user without deep mining skills can perform the deployment. This accelerates and simplifies the deployment process, and thus, saves time and costs.

The deployment system 120 enables deployment of mining models 154 in PMML format (also referred to as "mining PMML models") in BI tools 172. The deployment system 120 automates the process such that it is easier to deploy mining models 154 and data mining itself (e.g. data in data structures 152) in BI tools 174.

Certain embodiments process BI reports in a computing system that contains (i) a database system for containing raw data in data structures 152, carrying out data mining, and storing data mining results in mining models 154, and (ii) a BI server 170 containing a repository 174 for storing information defining structure and content of BI reports (e.g. BI meta models and BI report specifications). A set of BI templates (e.g. a set of BI meta model templates 142 and a set of BI report specification templates 144) are provided. The deployment system 120 prepares data for data mining, generates a data mining model, extracts the data mining model content into at least one table having a model table schema dependent on the mining model, and stores the at least one table in the database.

In response to storing the at least one table in the database, the deployment system 120 selects a BI template based on the type of the model, analyses the model table schema and the model table content, generates information defining the structure and content of a report based on the results of the analysis and on the selected BI template, and deploys the information defining the structure and content of a BI report 176 at the BI server 170.

In response to a user request, the BI report 176 is generated from the information defining the structure and content of the BI report 176 and the BI report 176 is delivered to the user from the BI server 170.

In certain embodiments, a piece of executable code 160 (e.g. a stored procedure) is stored in the data store 150, and execution of the piece of executable code triggers, in response to receiving data mining parameters from a user, generation of the data mining model in accordance with the received data mining parameters and extraction of the data mining model content into the at least one table.

In certain embodiments, the data preparation and the data mining model generation are monitored and repeated. In certain embodiments, the piece of executable code is used for repeating the data preparation and data mining model generation based on the monitoring and is generated by the deployment system 120. The input data that is used to compute a mining model, previously going through the data preparation phase can be monitored. In certain embodiments, if new data comes in, or if the current data changes, the data preparation, the modeling, and the extraction of resulting data mining model can be automatically started. In certain alternative embodiments, this processing can be started periodically, instead of triggered by a change in the input data.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g. operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g. an integrated circuit chip, Programmable Gate Array (PGA), Application Specific Integrated Circuit (ASIC), etc. The hardware logic may be coupled to a processor to perform operations. For example, the deployment system 120 may be implemented in hardware logic or a combination of software and hardware logic.

The deployment system 120 may be implemented as hardware (e.g. hardware logic or circuitry), software, or a combination of hardware and software.

Figure 27:
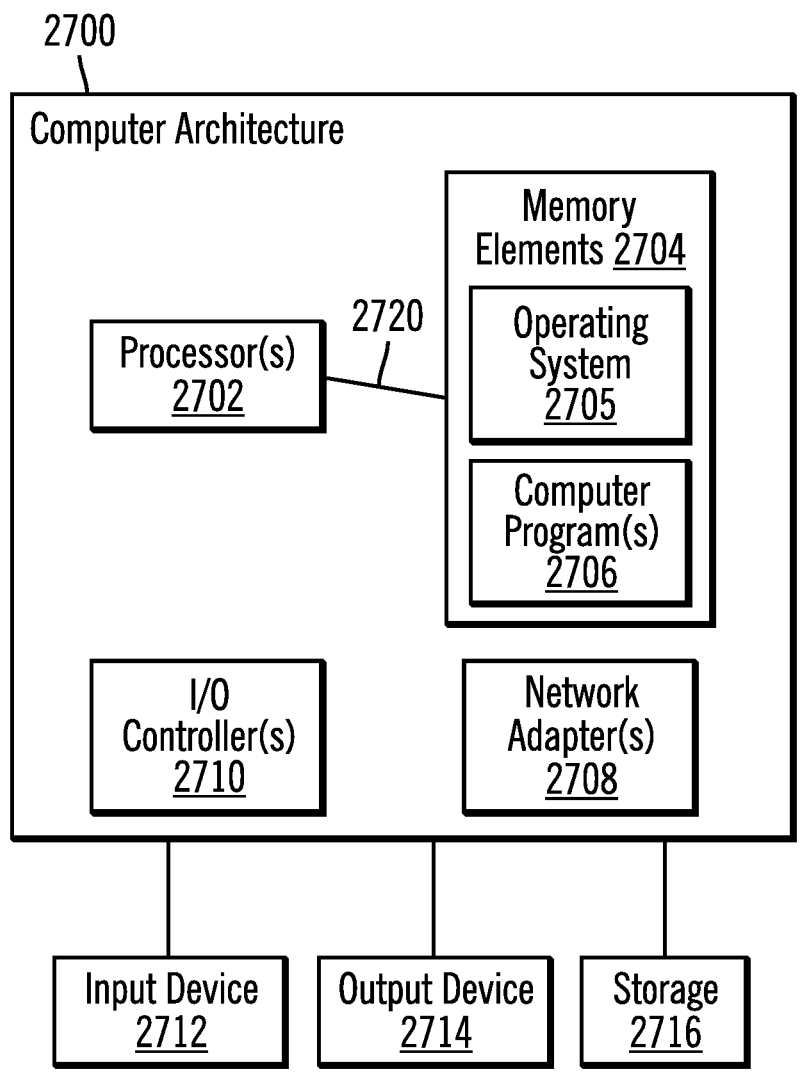
FIG. 27 illustrates a computer architecture that may be used in accordance with certain embodiments.

FIG. 27 illustrates a computer architecture 2700 that may be used in accordance with certain embodiments. Computing device 110, BI server 170, 870, 970, and/or BI client 180, 280, 980 may implement computer architecture 2700. The computer architecture 2700 is suitable for storing and/or executing program code and includes at least one processor 2702 coupled directly or indirectly to memory elements 2704 through a system bus 2720. The memory elements 2704 may include local memory employed during actual execution of the program code, bulk storage, and cache memories which provide temporary storage of at least some program code in order to reduce the number of times code must be retrieved from bulk storage during execution. The memory elements 2704 include an operating system 2705 and one or more computer programs 2706.

Input/Output (I/O) devices 2712, 2714 (including but not limited to keyboards, displays, pointing devices, etc.) may be coupled to the system either directly or through intervening I/O controllers 2710.

Network adapters 2708 may also be coupled to the system to enable the data processing system to become coupled to other data processing systems or remote printers or storage devices through intervening private or public networks. Modems, cable modem and Ethernet cards are just a few of the currently available types of network adapters 2708.

The computer architecture 2700 may be coupled to storage 2716 (e.g. a non-volatile storage area, such as magnetic disk drives, optical disk drives, a tape drive, etc.). The storage 2716 may comprise an internal storage device or an attached or network accessible storage. Computer programs 2706 in storage 2716 may be loaded into the memory elements 2704 and executed by a processor 2702 in a manner known in the art.

The computer architecture 2700 may include fewer components than illustrated, additional components not illustrated herein, or some combination of the components illustrated and additional components. The computer architecture 2700 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A computer system for processing Business Intelligence (BI) reports, comprising:
   a processor; and
   storage coupled to the processor, wherein the storage stores a computer program, and wherein the computer program is executable by the processor to perform operations, the operations comprising:
   using a database, coupled to the computer system, to generate information for consumption by a BI tool by:
   creating a description of data in one or more data tables, stored in the database, that identifies each column in each of the one or more data tables, wherein each column has multiple values;
   using the description of the data in the one or more data tables to create a new table, stored in the database, that includes a row for each value of the multiple values for each column in each of the one or more data tables and new columns for statistics about the data in the one or more data tables;
   generating BI meta information based on the description of the data in the one or more data tables and based on a schema and data of the new table that describes the columns for the statistics;
   generating a BI report specification that describes how a first BI report is to be rendered based on the schema and the data of the new table by describing a layout of data in the columns in each of the one or more data tables and in the columns for the statistics;
   deploying the BI meta information and the BI report specification to a BI server for use in generating the first BI report using the BI tool at the BI server;
   in response to a request for the first BI report,
      generating the first BI report dynamically with the BI tool at the BI server that dynamically invokes a stored procedure, stored in the database, with one or more parameters and that uses the BI meta information and the BI report specification to provide the statistics about the data in the one or more data tables; and
      displaying one or more graphs for the first BI report in a second screen;
   in response to another request for the first BI report after data in the one or more data tables has changed,
      using the new table to generate new BI meta information and a new BI report specification for use in generating a new BI report dynamically; and
      displaying one or more graphs for the new BI report in a second screen;
   in response to a request for a second BI report,
      using the new table to generate new BI meta information and another new BI report specification for use in generating a second BI report dynamically; and
      displaying one or more different graphs for the second BI report in a third screen.

2. The computer system of claim 1, wherein the operations further comprise:
   preparing the data in the one or more data tables for data mining.

3. The computer system of claim 1, wherein the operations for generating the BI meta information further comprise:
   analyzing a structure of the new table; and
   generating information defining one or more meta model objects.

4. The computer system of claim 1, wherein the operations for generating the BI report specification further comprise:
   generating information defining a structure and content of the first BI report.

5. The computer system of claim 1, wherein the operations further comprise:
   generating the stored procedure that is invoked to dynamically and repeatedly create the description of the data in the one or more data tables by modeling data in one or more data tables and to extract content of the description of the data in the one or more data tables into the new table.

6. The computer system of claim 1, wherein a mining model type is one of clustering, classification, association, regression, sequence rules, and time series.

7. The computer system of claim 1, wherein a meta model object type is an element of a model.

8. A computer program product for processing Business Intelligence (BI) reports, the computer program product comprising:

a computer readable storage medium having computer readable program code embodied therewith, the computer readable program code, when executed by a processor of a computer system, configured to:

use a database to generate information for consumption by a BI tool by:

creating a description of data in one or more data tables, stored in the database, that identifies each column in each of the one or more data tables, wherein each column has multiple values;

using the description of the data in the one or more data tables to create a new table, stored in the database, that includes a row for each value of the multiple values for each column in each of the one or more data tables and new columns for statistics about the data in the one or more data tables;

generating BI meta information based on the description of the data in the one or more data tables and based on a schema and data of the new table that describes the columns for the statistics;

generating a BI report specification that describes how a first BI report is to be rendered based on the schema and the data of the new table by describing a layout of data in the columns in each of the one or more data tables and in the columns for the statistics;

deploying the BI meta information and the BI report specification to a BI server for use in generating the first BI report using the BI tool at the BI server;

in response to a request for the first BI report,
generating the first BI report dynamically with the BI tool at the BI server that dynamically invokes a stored procedure stored, in the database, with one or more parameters and that uses the BI meta information and the BI report specification to provide the statistics about the data in the one or more data tables; and
displaying one or more graphs for the first BI report in a second screen;

in response to another request for the first BI report after data in the one or more data tables has changed,
using the new table to generate new BI meta information and a new BI report specification for use in generating a new BI report dynamically; and
displaying one or more graphs for the new BI report in a second screen;

in response to a request for a second BI report,
using the new table to generate new BI meta information and another new BI report specification for use in generating a second BI report dynamically; and
displaying one or more different graphs for the second BI report in a third screen.

9. The computer program product of claim 8, wherein the computer readable program code is configured to:
prepare the data in the one or more data tables for data mining.

10. The computer program product of claim 8, wherein, when generating the BI meta information, the computer readable program code is configured to:
analyze a structure of the new table; and
generate information defining one or more meta model objects.

11. The computer program product of claim 8, wherein, when generating the BI report specification, the computer readable program code is configured to:
generate information defining a structure and content of the first BI report.

12. The computer program product of claim 8, wherein the computer readable program code is configured to:
generate the stored procedure that is invoked to dynamically and repeatedly create the description of the data in the one or more data tables by modeling data in one or more data tables and to extract content of the description of the data in the one or more data tables into the new table.

13. The computer program product of claim 8, wherein a mining model type is one of clustering, classification, association, regression, sequence rules, and time series.

14. The computer program product of claim 8, wherein a meta model object type is an element of a model.

* * * * *